(12) United States Patent  (10) Patent No.: US 9,305,328 B2
Mahajan et al.  (45) Date of Patent: Apr. 5, 2016

(54) METHODS AND APPARATUS FOR A DISTRIBUTED OBJECT RENDERER

(71) Applicant: Zynga Inc., San Francisco, CA (US)

(72) Inventors: Amitt Mahajan, San Francisco, CA (US); Matt Ocko, San Francisco, CA (US); Joel Poloney, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 120 days.

(21) Appl. No.: 14/285,610

(22) Filed: May 22, 2014

(65) Prior Publication Data

US 2014/0253568 A1  Sep. 11, 2014

Related U.S. Application Data

(63) Continuation of application No. 12/870,151, filed on Aug. 27, 2010, now Pat. No. 8,743,130.

(60) Provisional application No. 61/238,136, filed on Aug. 28, 2009.

(51) Int. Cl.
*G06T 1/20* (2006.01)
*A63F 13/30* (2014.01)
*G06F 9/50* (2006.01)
*G06T 11/60* (2006.01)

(52) U.S. Cl.
CPC . *G06T 1/20* (2013.01); *A63F 13/12* (2013.01); *G06F 9/5027* (2013.01); *G06T 11/60* (2013.01); *A63F 2300/538* (2013.01); *A63F 2300/577* (2013.01)

(58) Field of Classification Search
CPC .............. G06T 1/20; A63F 13/30; G06F 9/50
See application file for complete search history.

*Primary Examiner* — Todd Buttram
(74) *Attorney, Agent, or Firm* — Martine Penilla Group, LLP

(57) ABSTRACT

A method performed by software generates a render request record for a render request submitted by a user of an app and stores the render request record in a queue database. The render request includes a visualization to be rendered. The software selects the render request record from the queue database. Selection of the render request record is determined at least in part by a priority value that depends on an amount of time the user has spent using the app. The software generates a rendered image for the selected render request record, using render data. Then the software publishes a publishing element including the rendered image to a newsfeed stream displayed by a social networking site.

20 Claims, 15 Drawing Sheets

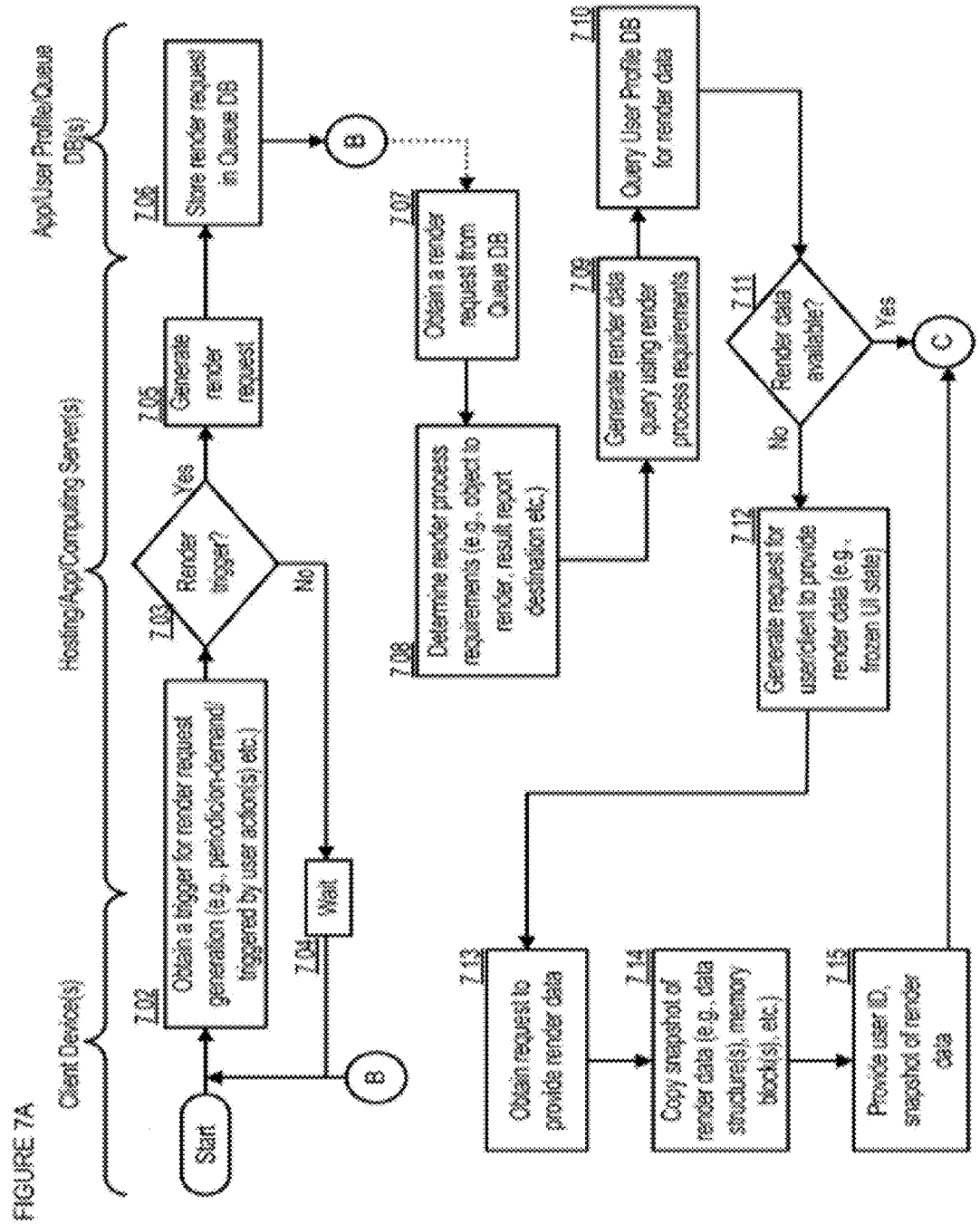

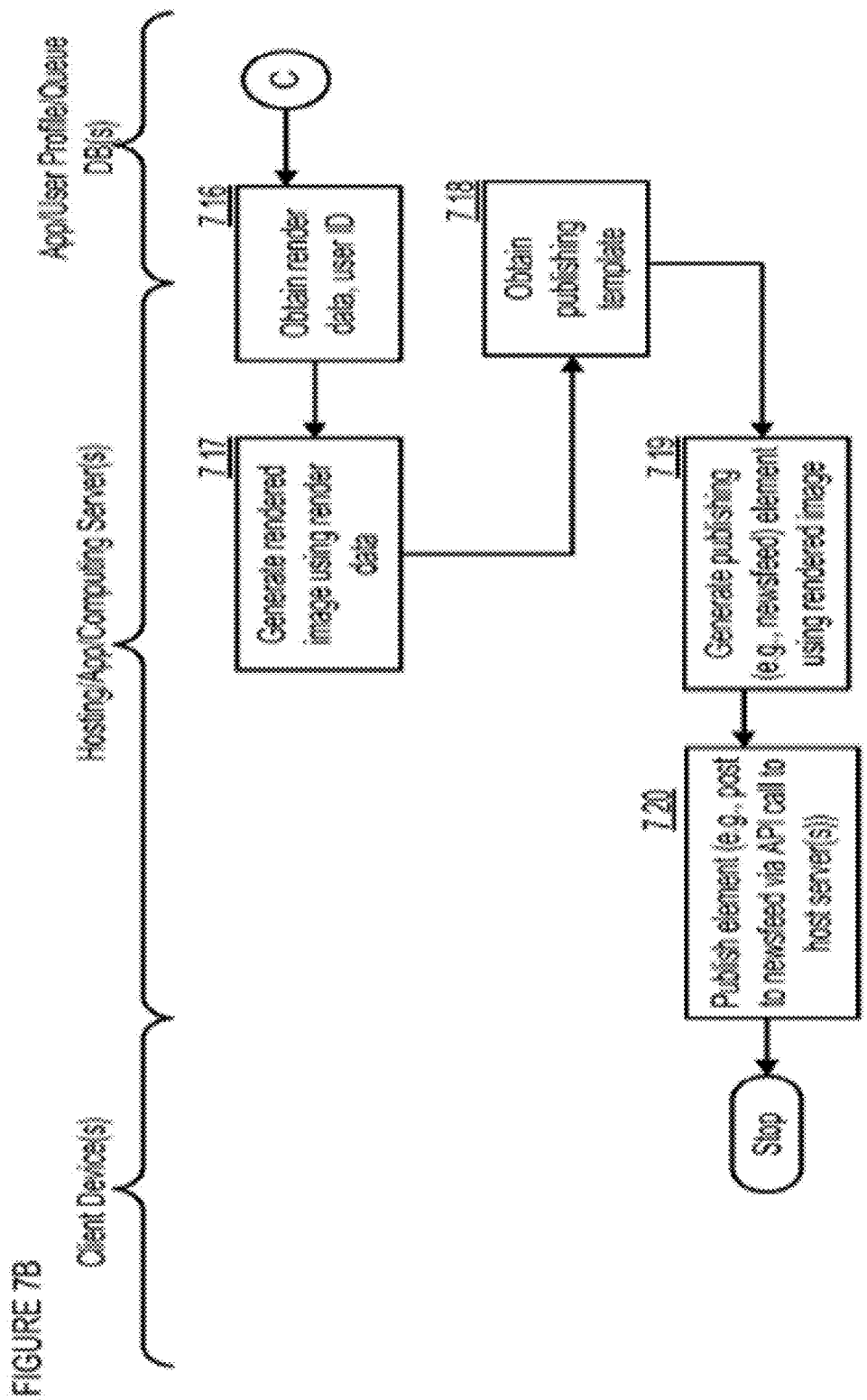

Render Request Selected for Dequeuing:   Queue Position 4

EXEMPLARY REQUEST MANAGEMENT COMPONENT

METHODS AND APPARATUS FOR A DISTRIBUTED OBJECT RENDERER

PRIORITY CLAIM

This application is a continuation of U.S. patent application Ser. No. 12/870,151 filed on Aug. 27, 2010, entitled "APPARATUSES, METHODS AND SYSTEMS FOR A DISTRIBUTED OBJECT RENDERER", which claims priority under 35 USC §119 to U.S. provisional patent application Ser. No. 61/238,136 filed Aug. 28, 2009, entitled "SYSTEM AND METHOD FOR DISTRIBUTED RENDERING OF FLASH OBJECTS." This application claims priority to the aforementioned applications and the entire contents of the aforementioned applications are herein expressly incorporated by reference.

FIELD

The present invention is directed generally to apparatuses, methods, and systems for rich multimedia Internet applications, and more particularly, to APPARATUSES, METHODS AND SYSTEMS FOR A DISTRIBUTED OBJECT RENDERER.

BACKGROUND

Users may interact online with a variety of rich multimedia applications. Users may contemplate sharing interesting information with their social networks. Various Internet visualization libraries allow for the generation of rich multimedia Internet applications.

SUMMARY

The APPARATUSES, METHODS AND SYSTEMS FOR A DISTRIBUTED OBJECT RENDERER ("DOR") implement distributed rendering of complex visualizations in rich multimedia objects for sharing in online social networking applications.

In one embodiment, a distributed rendering processor-implemented method is disclosed, comprising: obtaining a request to render an image of a visualization included in a client application ("app"); analyzing the render request to determine data required for render processing; providing a request for the data required for render processing; obtaining the data required for render processing upon providing the request for the required data; recreating an app state of the client app using the obtained data required for render processing, the recreated app state including data related to the visualization included in the client app; rendering the image of the visualization including in the client app using the recreated app state; generating a publishing element using the rendered image of the visualization included in the client app; and providing the publishing element for publication.

In one embodiment, a rendering request processor-implemented method is disclosed, comprising: obtaining a client app from an app database; obtaining user input from a user for the client app; obtaining data associated with the client app and pertaining to a member of a social graph of the user; generating data pertaining to a visualization included in the client app based on the obtained user input and the obtained data pertaining to the member of the social graph of the user; providing a request for rendering an image of the visualization included in the client app; providing the data pertaining to the visualization for processing the request for rendering the image of the visualization included in the client app; and providing an indication to publish the image of the visualization included in the client app.

BRIEF DESCRIPTION OF THE DRAWINGS

The accompanying appendices and/or drawings illustrate various non-limiting, example, inventive aspects in accordance with the present disclosure:

FIGS. 7A-B are of logic flow diagrams illustrating aspects of distributed rendering of visualizations in rich multimedia objects in some embodiments of the DOR;

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

Distributed Object Renderer (DOR)

Figure 1:
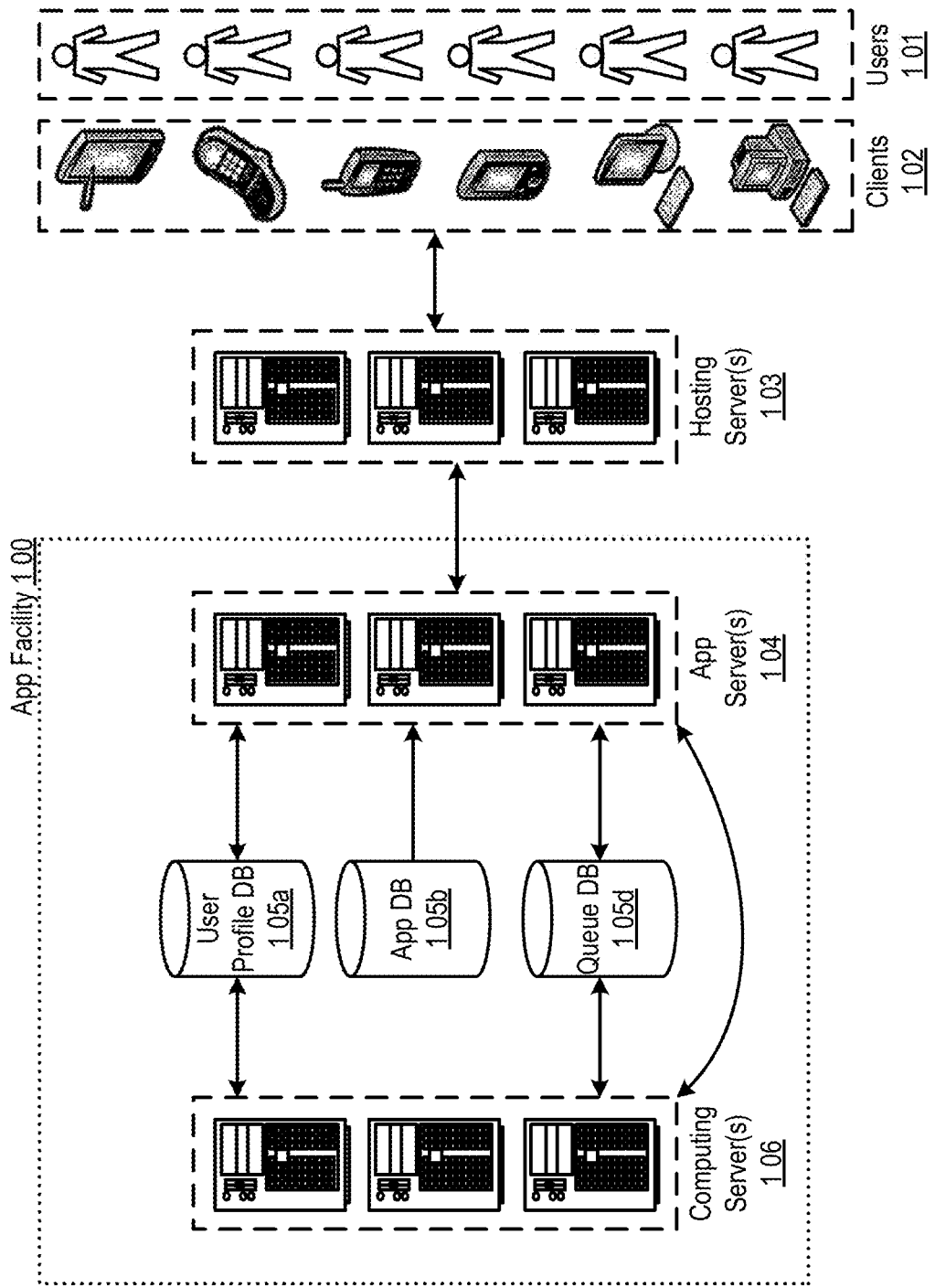
FIG. 1 is of a block diagram illustrating various Distributed Object Renderer ("DOR") components and/or affiliated entities involved in distributed rendering of visualizations in rich multimedia objects for sharing in social networking applications in some embodiments of the DOR.

FIG. 1 is of a block diagram illustrating various Distributed Object Renderer ("DOR") components and/or affiliated entities involved in distributed rendering of visualizations in rich multimedia objects for sharing in social networking applications in some embodiments of the DOR. A variety of other compositions and arrangements of DOR components and/or affiliated entities may be used in alternative embodiments of the DOR as is further discussed with regard to FIG. 9.

In some implementations, the DOR may include an application ("app") facility 100. App facility 100 may provide social networking applications (e.g., multi-user online games) for users 101. The users may interact with the app facility via a variety of clients 102. In some implementations, the app facility may interact with the users and/or clients via a hosting server 103. For example, the hosting server 103 may be included within the infrastructure of a social networking website providing online social networking services for the users. In some implementations, the hosting server 103 may provide one or more application programming interfaces ("APIs") for the app facility to interface with the hosting server and with any users associated with the hosting server and/or social networking website for which the hosting server provides hardware infrastructure. In some implementations, the hosting server may provide a wide variety of APIs for the app facility 100. For example, the hosting server may provide APIs via which the app facility may obtain/modify/append user profile information, user data (e.g., e-mail, text messages, blog posts, microblogs, Facebook® wall posts, tweets, status messages and/or updates), user associated media content (e.g., audio/video files, etc.), RSS and/or other news feeds, social graph information pertaining to users of a social networking service/website hosted by the hosting server, and/or the like.

In some implementations, app facility 100 may include one or more app servers 104. An app server may provide one or more social networking applications (e.g., multi-user online games) for the users and/or clients. For example, the app server may provide a custom client-side application for a client. The client-side application may execute on a client of a user. In some implementations, the client-side application may communicate and/or exchange data/media with an app server included in the developer system to provide social networking application functionality for the user. In other implementations, a generic web browser, telnet, command-line and/or other application interface/environment may be available on a client, and may interface with an app server included in the developer system. In some implementations, an app server may utilize one or more APIs provided by hosting server to communicate with the client/user. The app server may also utilize the APIs provided by the hosting server to obtain/modify/append user profile information, user data (e.g., e-mail, text messages, blog posts, micro-blogs, tweets, status messages/updates), user associated media content (e.g., audio/video files, etc.), RSS and/or other news feeds, social graph information pertaining to users of a social networking service/website hosted by the hosting server, and/or the like.

In some implementations, the app facility may include one ore more databases, including a user profile database 105a, and app database 105b. The app database 105b may store one or more applications developed for execution on the app servers and/or on clients. In some implementations, the DOR may provide social networking application services for a large number of users utilizing a wide variety of client devices/systems. Such client devices may be utilizing a wide variety of operating systems types/versions/builds/service packs, network connection types, connection bandwidths, display screen sizes, web browser environments, browser locales, language and/or other personalization settings, communication interfaces and/or like client device/system preferences/settings. Some client devices may obtain standalone custom applications (e.g., from the app database via an app server), while other client devices may utilize modern web technologies (e.g., JavaScript™, Adobe Flash®, HTML5, etc.) via a web browser to provide social networking application services for the users. Accordingly, in some implementations, the app facility may store and maintain a large number of code modules, code versions, application modules, application versions, module/application dependency graphs, application/module specifications, compatibility lists, and/or the like, to provide social networking application services to a broad user/client audience. In some implementations, the applications stored in the app database 105b may be compiled from source code stored in the app database. In some implementations, applications may be compiled from source code in the app database prior to deployment of the application to users and/or clients of the app facility and/or affiliated entities (e.g., social network hosted by hosting server). In alternate implementations, source code from the app database may be compiled at runtime and/or on-the-fly during deployment to users and/or clients. In further implementations, instructions from source code may be read by the app servers (e.g., line-by-line) directly from the app database and implemented as they are read by the app servers to provide social networking application services to the users and/or clients. In implementations wherein source code from the app database is compiled prior to run time, such compilation may be performed by computing servers 106 included within the app facility.

In some implementations, an app server with which a client is interacting may select an application stored in the app database to provide for the client based on properties of the client (e.g., type of client, location, language settings, user preferences, browser locale, etc.). The app server may then obtain the application from the app database and provide the app for the client. In alternate implementations, an app server may load onto itself an application from the app database based on the properties of the client with which the app server is required to interact. In some implementations, during interaction of an application executing on a client with an application executing on an app server, data pertaining to a user and/or client may be generated. For example, an app server may be executing a multi-user online gaming application in which a user using a client running a client-side application is taking part. As part of the experience provided by the application executing on the client and app server, user data (e.g., game state, user messages, user profile updates, etc.) may be generated. In some implementations, such user data may be stored in a user profile database 105a included within the app facility. In some implementations, the app server may update and/or utilize data stored in the user profile database of the app facility and/or data obtained from the hosting server (e.g., social networking data of the user from a social networking website implemented on the hosting server) to provide various social networking application abilities for the user.

In some implementations, a user utilizing an app delivered to a client device via an app server may interact with the app. The app may generate and/or update data in a data structure on a client and/or server based on the user's interaction with the app. In some implementations, the user interaction with the app may result in a data structure including data representing a complex visualization (e.g., a scene in a multi-user gaming application in which the user is participating). The user may desire to obtain an image representing a complex visualization within the app running on the user's client device. The user and/or client device may submit a render request requesting that the app facility generate an image representing the complex visualization (e.g., a thumbnail). In some implementations, a number of users may be interacting with applications provided by the app server, and may generate a number of such requests. In such implementations, the app facility may store the render requests from the users in render request queue(s) in a queue database 105d. In some implementations, a computing server 106 may be monitoring the render request queues in the queue database 105d. In some implementations, the computing server, upon encountering a trigger condition, may obtain a render request from the queue, parse the render request, determine a user associated with the render request, obtain data (e.g., a data structure associated with user and/or app) pertaining to the render request, and generate a rendered image according to the render request based on the obtained data. In some implementations, the app facility may provide the generated rendered image for distribution, for example, via a social networking application provided by the hosting server.

Figure 2:
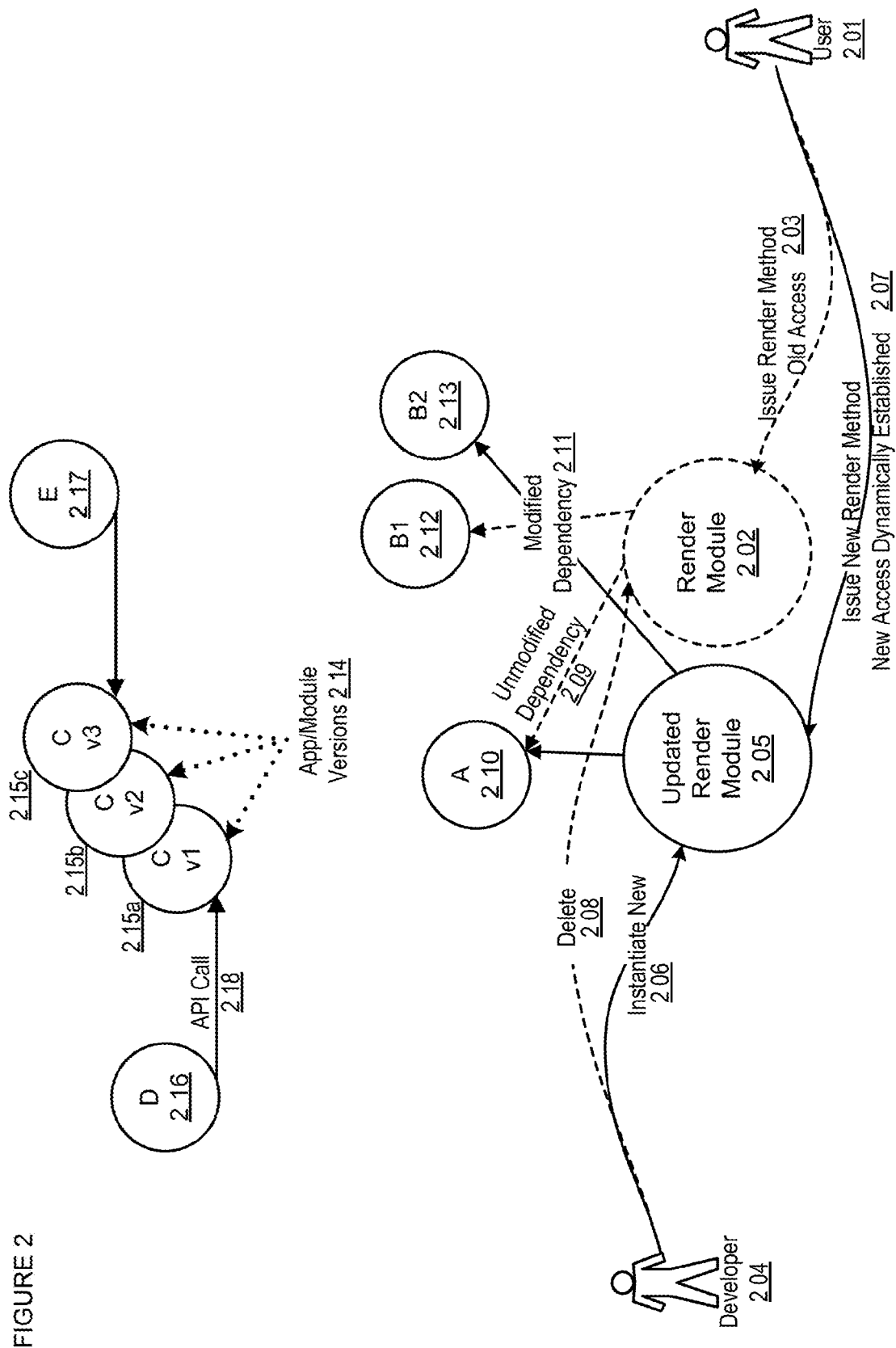
FIG. 2 is of a block diagram illustrating aspects of distributed rendering of visualizations in rich multimedia objects in some embodiments of the DOR.

FIG. 2 is of a block diagram illustrating aspects of live reconciliation of code updates in some embodiments of the DOR. In some implementations, a user 201 may wish to utilize an application module (e.g., render module 202). The user's client may issue a request (e.g., 203) to a server to access the desired application module. In response to the user's request, the server may provide the requested application module. The application module (e.g., render module 202) may utilize other application modules ("dependent application modules"), e.g. A 210, B 212, etc., to provide its designed features for the user. In some implementations, an application module ("calling application module"), e.g., D 216, may utilize a dependent application module (e.g., C v1 215a) via an application programming interface ("API") call (e.g., 218).

In some implementations, a software application developer may contemplate modifications to an application module being utilized by the user. For example, with reference to FIG. 2, the developer may contemplate modifications to render module 202, so as to generate updated render module 205. The developer may contemplate modifications to an application module for a variety of reasons. For example, the developer may contemplate modifications including, but not limited to, ones that enhance the range of features provided to the user/client, improve the speed/responsiveness of the application module, fix bugs identified in prior version of code corresponding to the application module, and/or the like. The developer may input (e.g., manually enter) the contemplated modifications to the code of the module to generate an updated code module. The developer may provide the updated code module to the app facility. In response, the app facility may compile the updated code module, and generate an updated version of the application module (e.g., updated render module 205). In some implementations, an updated version of an application module may utilize a different set of dependent application modules than the original version of that application module. For example, with reference to FIG. 2, the updated render module 205 and original render module 202 both may utilize application module A 210. However, the updated render module 205 may utilize application module B2 213, while the original render module 202 may utilize application module B1 212 instead of application module B2 213.

In some implementations, a user may be utilizing an application module for which the app facility has generated an updated version. In such implementations, the app facility may attempt to transfer the user from the user's version of the application module to the updated version. For example, the app facility may generate an instance of the updated version of the application module (e.g., updated render module 205), and generate instances of the dependent application modules (e.g., A 210, B2 213) utilized by the updated version. The app facility may issue a new access request (e.g., 207) for the updated version of the application module on behalf of the user, and dynamically establish access for the user to the updated version. The app facility may then delete 208 any instances of outdated versions (e.g., render module 202) of the application module and delete instances of any dependent application modules (e.g., B1 212) not being utilized by the updated version of the application module. In some implementations, the developer system may perform such transfer of users from one application module version to another dynamically (e.g., 230) in real-time, while the user is continuously utilizing the multi-user social networking application, as discussed further in this disclosure.

In some implementations, a multi-user social networking application may comprise a plurality of application modules (e.g., 202, 205, 210, 212-213, 215a-c, 216-217). An application module may be designed to execute within a server and/or client computing environment. In some implementations, the developer system may compile a plurality of versions of a single application module (e.g., 215a-c). In some implementations, different versions 214 of the same application module (e.g., 215a-c) may be utilized in different application scenarios. For example, with reference to FIG. 2, application module D 216 may utilize version 1 (215a) of application module C. Application module E 217, however, may utilize version 3 (215c) of application module C. The version of an application module utilized in an application scenario may depend on various factors including, but not limited to: user preferences (e.g., language, type of user experience such as normal/HD video, etc.), client device type, hardware installed on the client, software resources available at the client, the features that the application is required to provide for the user, the server computing environment, and/or the like.

Figure 3:
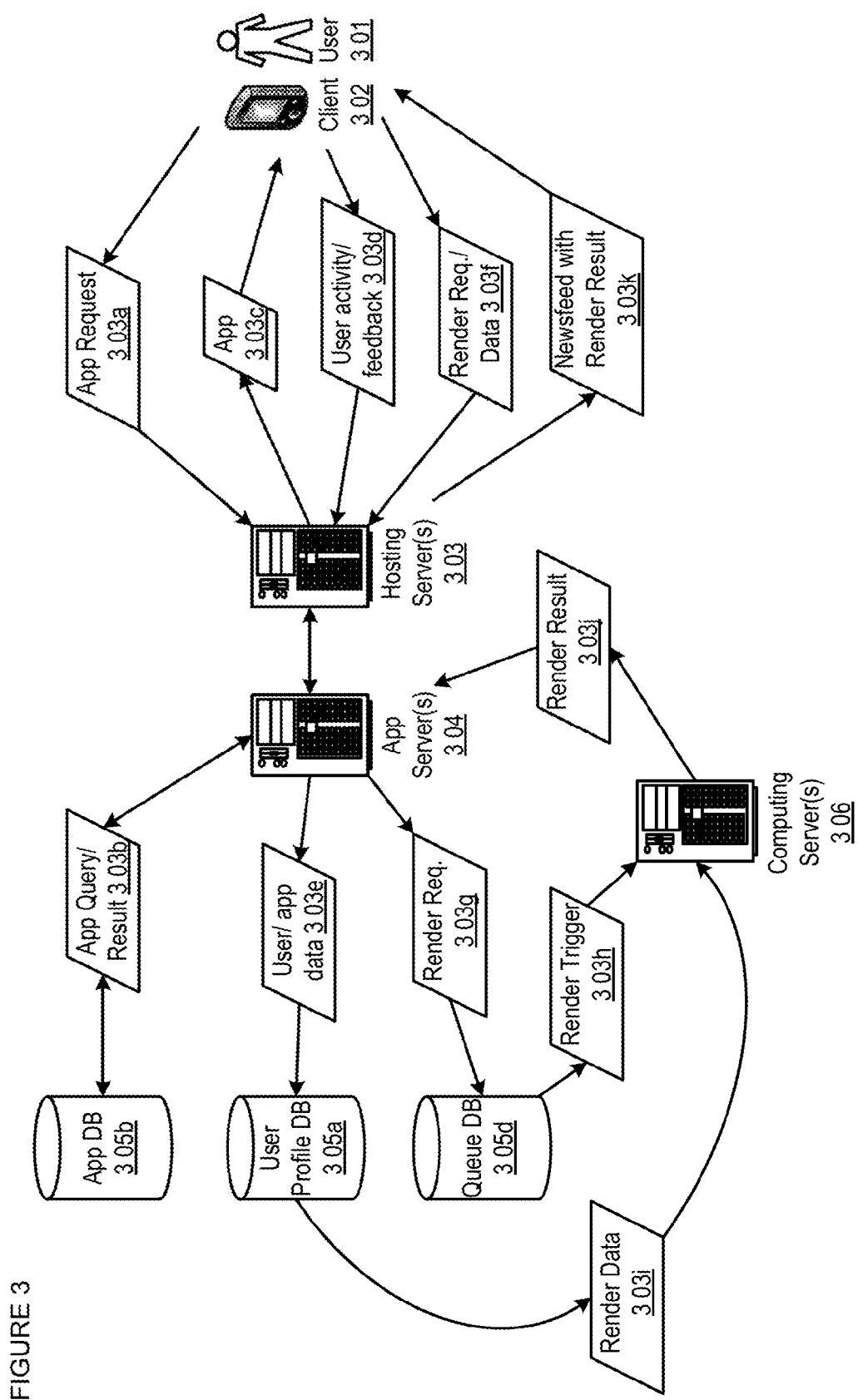
FIG. 3 is of a data flow diagram illustrating aspects of distributed object rendering of visualizations in rich multimedia objects in some embodiments of the DOR.
Figure 4A:
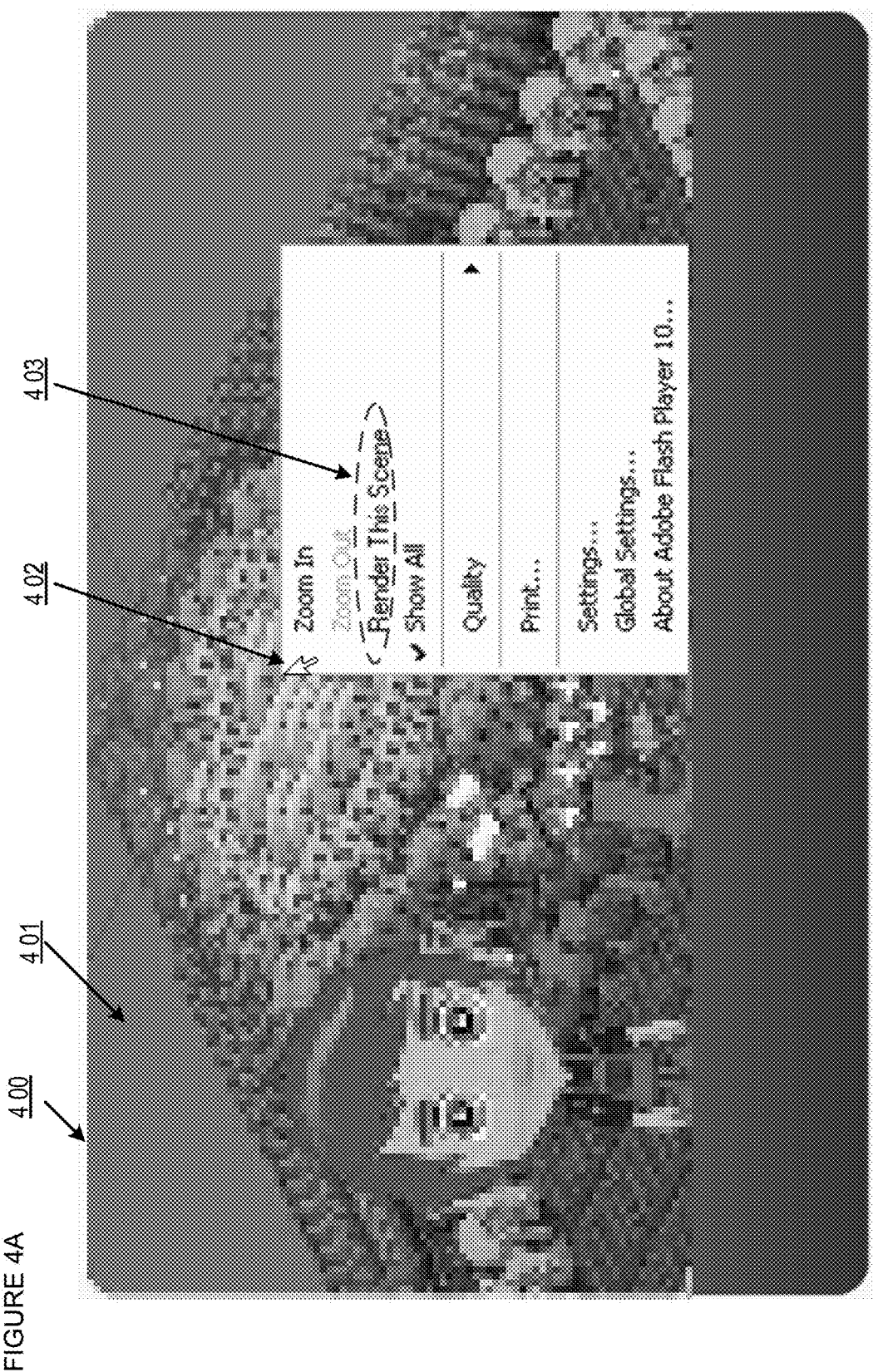
FIGS. 4A-F are of exemplary screenshots illustrating aspects of rich multimedia object user interface features in some embodiments of the DOR.
Figure 4B:
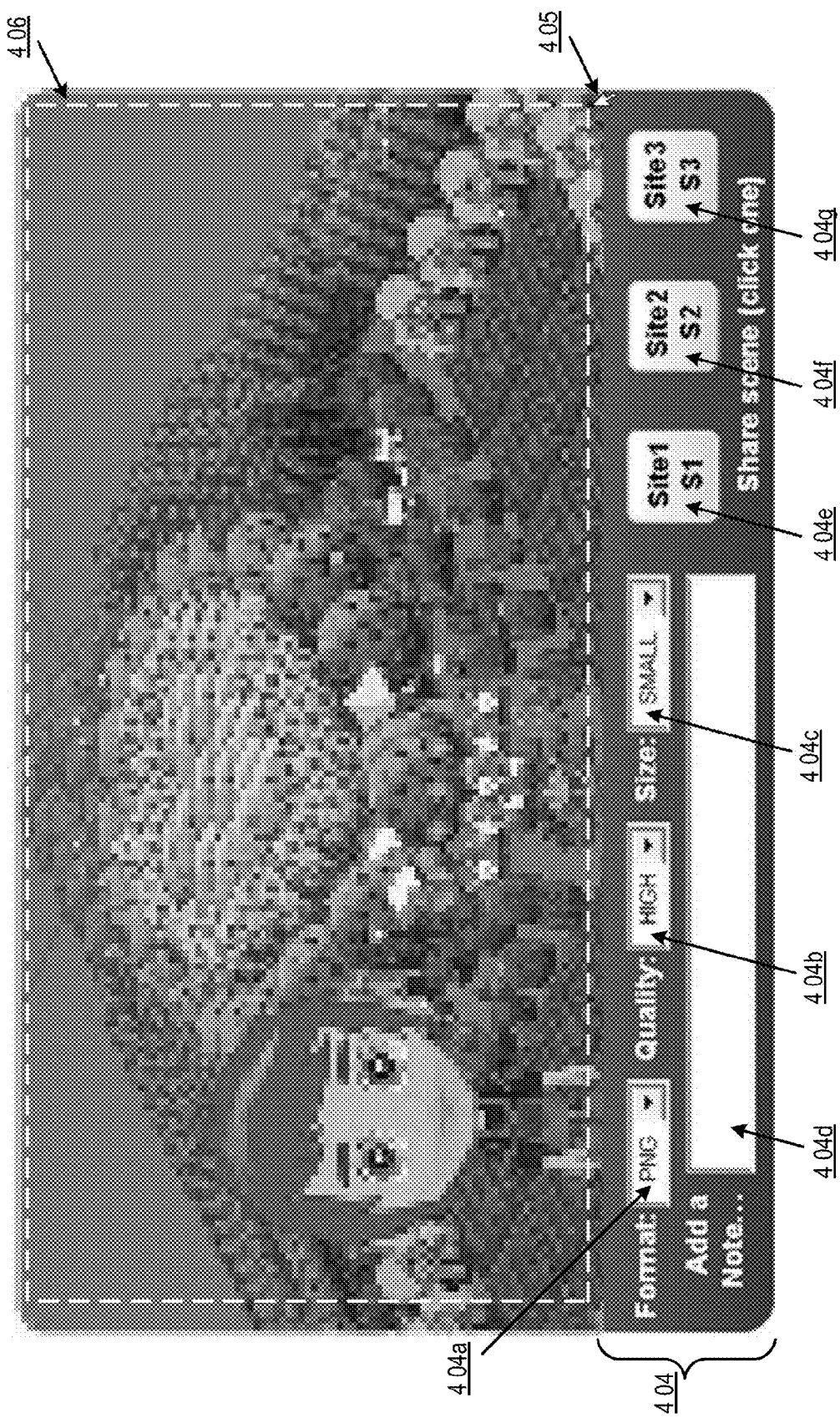
Figure 4C:
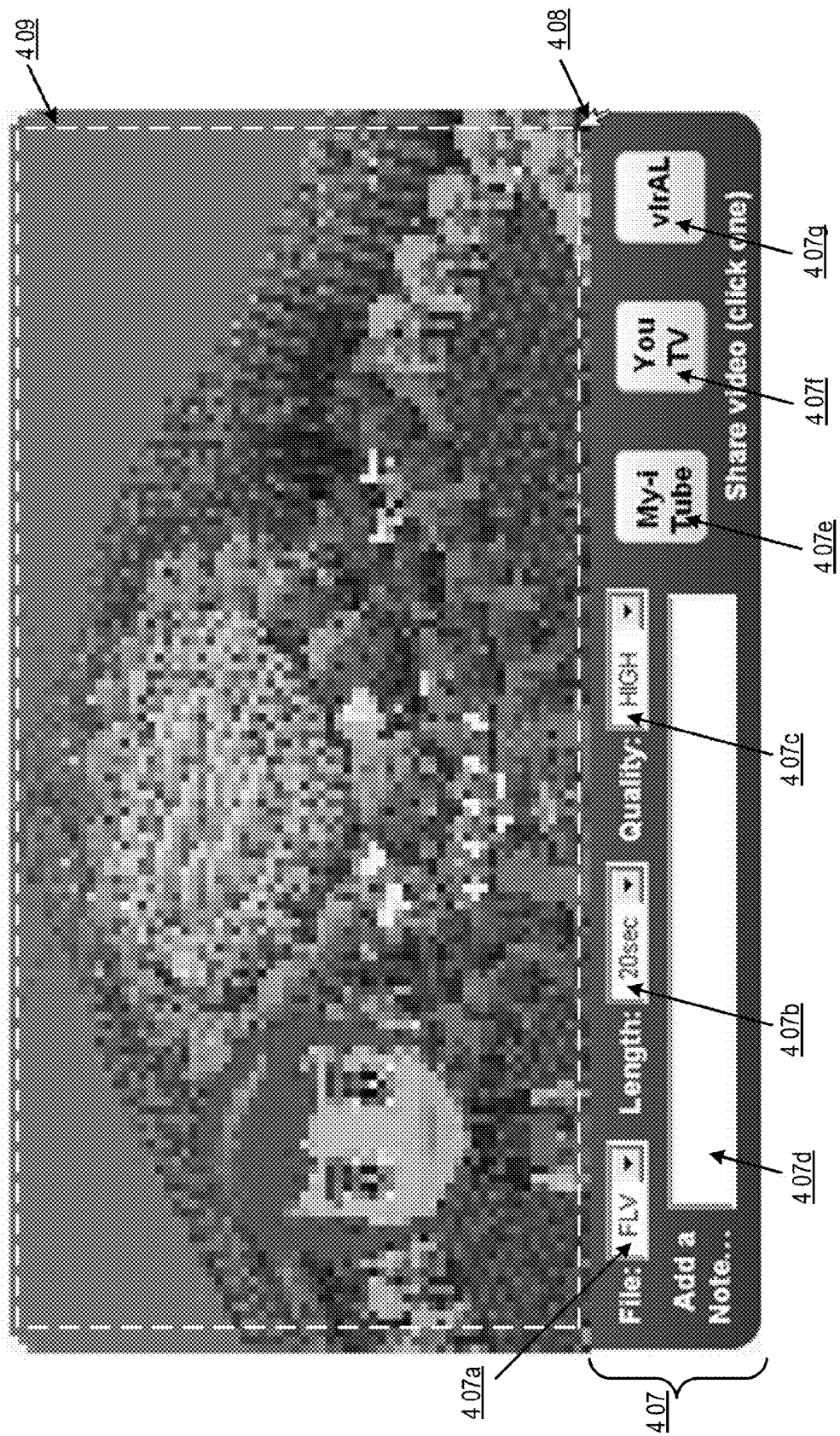
Figure 4D:
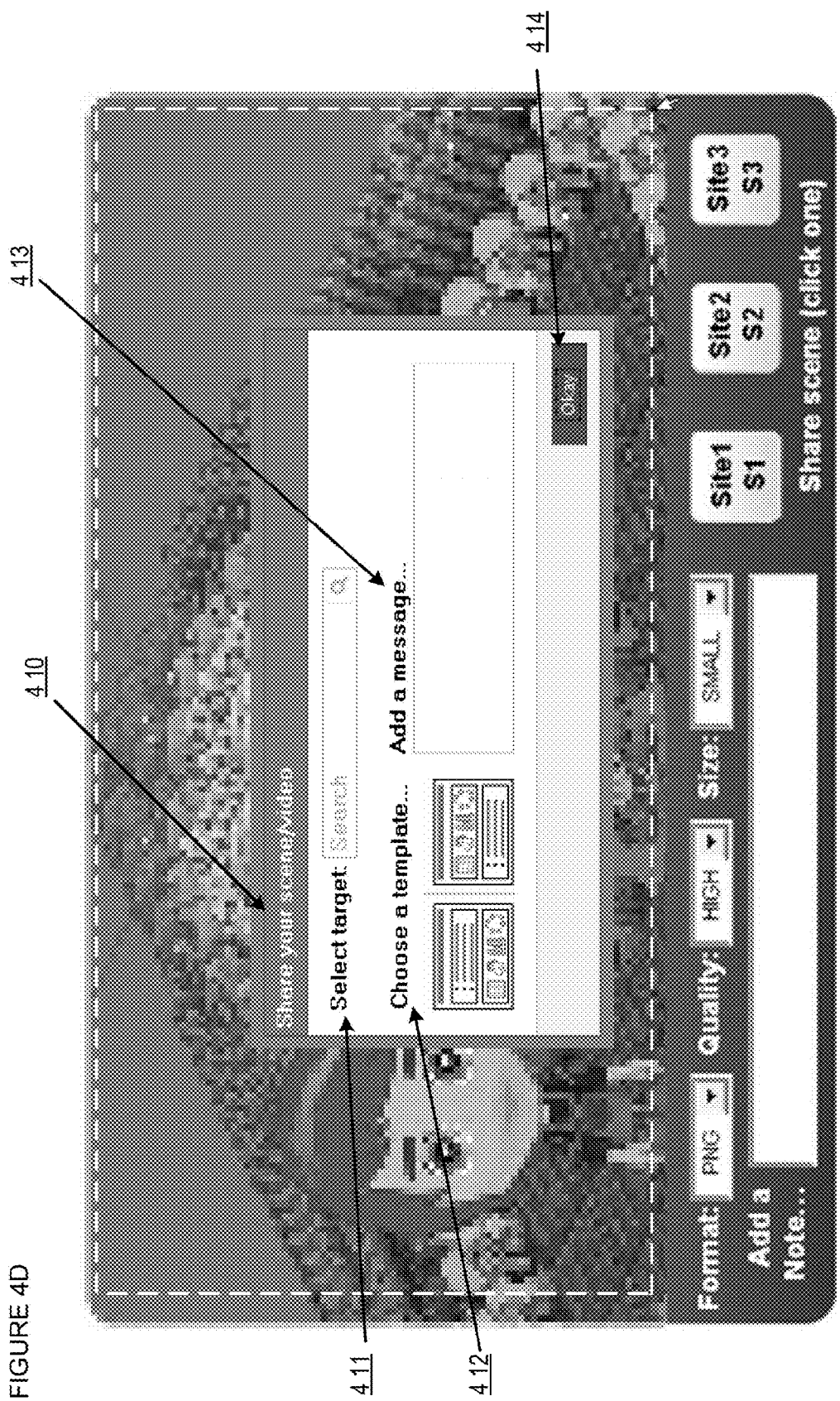
Figure 4E:
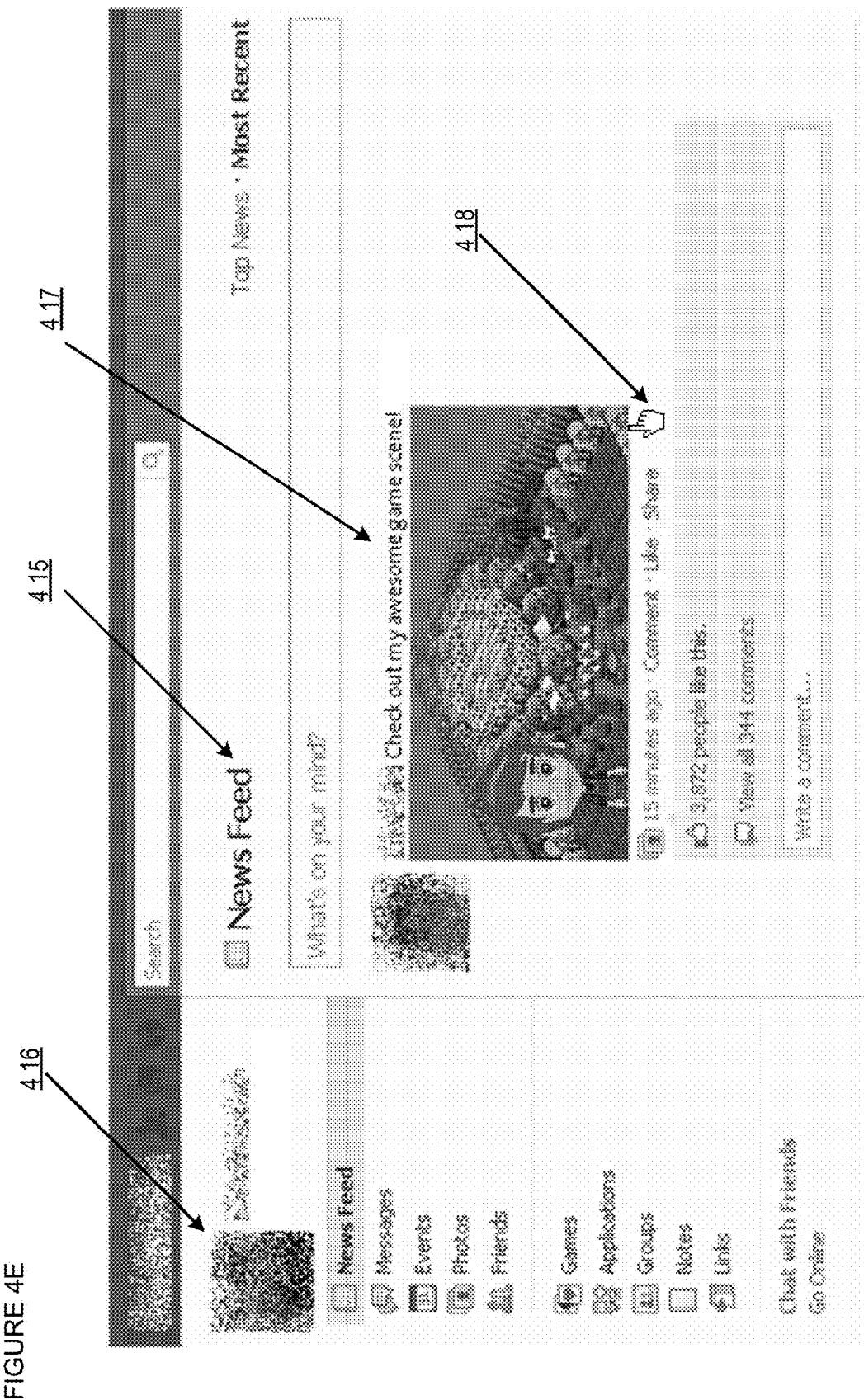
Figure 4F:
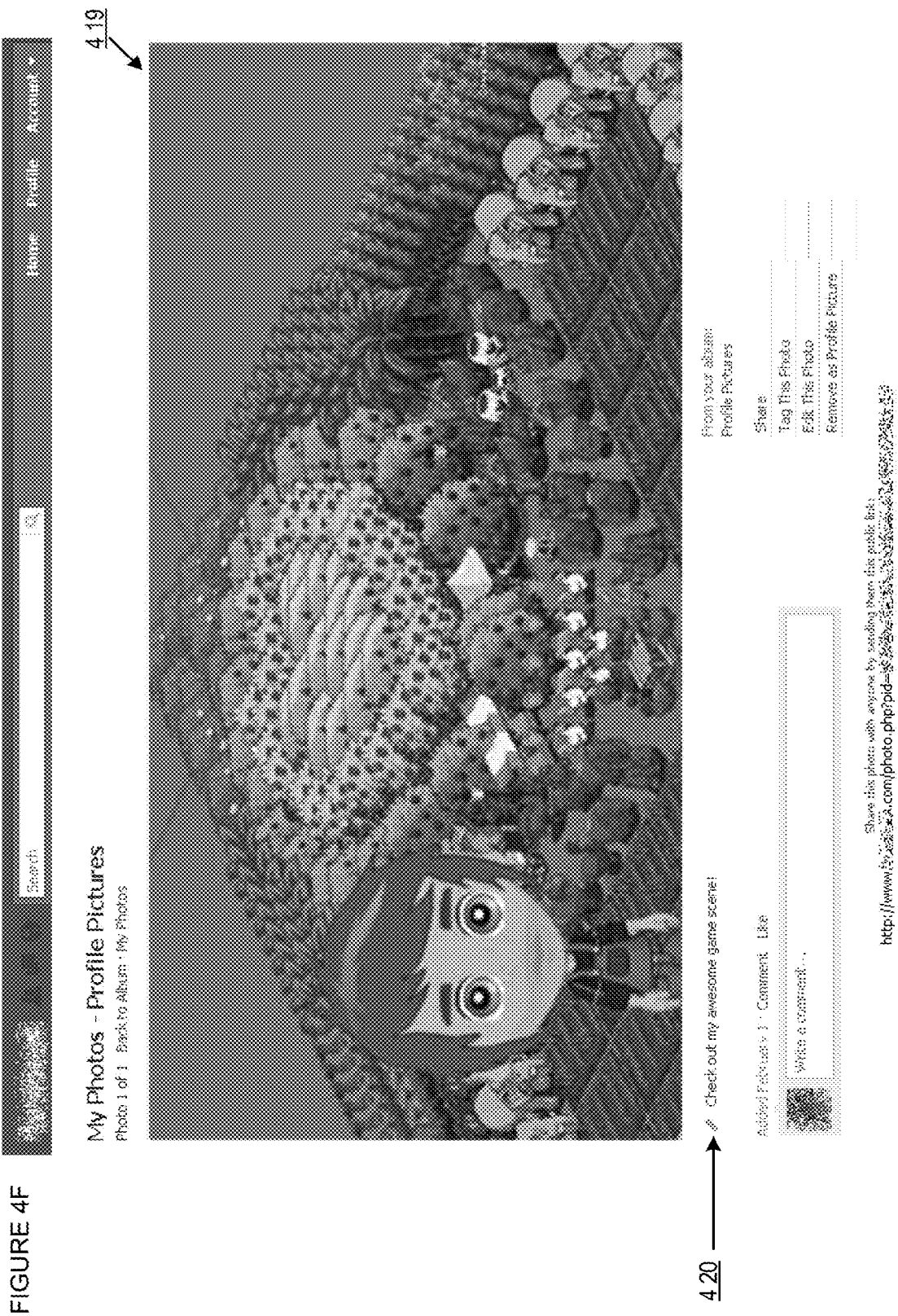

FIG. 3 is of a data flow diagram illustrating aspects of distributed object rendering of visualizations in rich multimedia objects in some embodiments of the DOR. In some implementations, a user 301 may interact via a client device 302 with a hosting server 303 and/or app server 304. For example, the user may be a registered user of a social networking and/or other sharing site (e.g., Digg™, Reddit®, Google Buzz™, Myspace®, Facebook®, Blogger™, YouTube®, and/or the like) and may interact with, e.g., a server of the social networking site (hereinafter "hosting server") via a smartphone. An app server 304 may configured to provide an app for the social networking and/or sharing site users, and/or other users, via an application programming interface ("API") provided by hosting server. In some implementations, the user 301 may provide a request 303a for an app to the app server (e.g., via the hosting server). For example, a browser application executing on the client device may provide, on behalf of the user, a Hypertext Transfer Protocol ("HTTP(S)") GET message for a HyperText Markup Language ("HTML") page, wherein the HTML page includes JavaScript™ commands to embed an Adobe® Flash object including an application for the user in the HTML page. An exemplary HTTP(S) GET message that may be provided by a browser executing on the client device to request an HTML page is provided below:

```
GET /poker.html HTTP/1.1
Host: www.appserver.com
User-Agent: Mozilla/4.0
```

In response to the app request 303a, the hosting server and/or app server may provide the app requested by the user and/or client. For example, with reference to the example browser HTTP(S) GET request above, the hosting server may provide an HTML page including a reference to an Adobe® Flash object (including a user application) stored on an app server. An exemplary HTML code listing including JavaScript™ commands referencing an Adobe® Flash object within the HTML page is provided below:

```
<html>
<div id="GameStage">
 If you're seeing this, you don't have Flash Player installed.
</div>
```

```
<script type="text/javascript">
  var app = new SWFObject ("http://games.appserver.com/poker.swf",
  "Media",
    "640", "480", "8", "#000000");
  app.addParam ("quality", "high");
  app.write ("GameStage");
</script>
</html>
```

Upon obtaining the app, the client device may execute the app for presentation to the user. For example, with reference to the examples above, a web browser executing on the client device may render the HTML web page and may communicate with the app server to download the Adobe® Flash object. An Adobe® Flash browser plug-in installed on the client device and operating in conjunction with the browser may play/execute the downloaded Flash object for presentation to the user. In some implementations, the app may include interactive features, and may allow the user to provide user input/feedback 303d via a variety of mechanisms (e.g., keyboard entry into a command-line interface, mouse input in a graphical user interface, gestures on a touch-sensitive interface, voice commands, etc.). In some implementations, the client device executing the app may generate, maintain, update and/or store data pertaining to the user's interaction with the app (e.g., an app state, an app data structure, a block of memory with data variables, a Flash movie clip, etc.). For example, the app may store a data structure encoded according to the JavaScript Object Notation ("JSON") format. An exemplary JSON-encoded data structure is provided below:

```
"app_data"
{
"app_id": "A236269",
"app_name": "poker",
"player_id": "jqpublic",
"player_name": "John Q. Public",
"gameroom_id": "AHWJ20100630",
"md5_auth", "f585e3efede0c3b400b25908f8fa3f6d",
"player_action": {
   "timestamp": "2010-06-30 09:23:47",
   "action_type": "raise",
   "action_amount": "50.00",
   "action_source": "credit card 1"
   }
}
```

In some implementations, the app may provide data stored on the client device for the hosting and/or app servers. For example, an Adobe® Flash object may include ActionScript™ 3.0 commands to create a Secure Sockets Layer ("SSL") connection with a server, generate a message including a JSON-encoded data structure such as illustrated in the example above, and send the message via the secure SSL connection to the server. Exemplary commands, written substantially in the form of ActionScript™ 3.0, to create a secure SSL connection to a server, load data from a locally stored JSON-encoded data file, and send a message including the JSON-encoded data via the SSL connection to the server, are provided below:

```
// import required packages
import flash.events.*;
import flash.net.socket;
import flash.net.URLLoader;
import flash.net.URLRequest;
import com.adobe.serialization.json.*;
// obtain server socket policy file, create socket connection to server port
system.security.loadPolicyFile("xmlsocket://games.appserver.com:208");
msg = new socket( ) ;
msg.connect("https://games.appserver.com", 255);
// load data as text string from .json file
var loader:URLLoader = new URLLoader( );
var request:URLRequst = new URLRequest( );
request.URL = "data.json";
loader.dataformat = "text"
loader.load(request)
// transmit data to server via secure SSL connection, then close socket
msg.writeMultiByte(loader.data, "UTF-8");
msg.close( );
```

In some implementations, the server receiving data from the client device executing the app may obtain the data, extract variables from the data if needed, and store the data and/or variables 303e in a user profile database 305a. For example, with reference to the exemplary client transmission of JSON-encoded data via a SSL connection provided above, the server may be executing a Hypertext Preprocessor ("PHP") script. The PHP script may implement a SSL socket server which listens to incoming communications on a server port to which the client device sends the JSON-encoded data. Upon identifying an incoming communication, the PHP script may read the incoming message from the client device, parse the received JSON-encoded text data to extract information from the JSON-encoded text data into PHP script variables, and store the data and/or extracted information in a relational database accessible using the Structured Query Language ("SQL"). An exemplary listing, written substantially in the form of PHP/SQL commands, to accept JSON-encoded text data from a client device via a SSL connection, parse the text data to extract variables, and store the data to a database, is provided below:

```
<?PHP
// set ip address and port to listen to for incoming data
$address = '192.168.0.100' ;
$port = 255;
// create a server-side SSL socket, listen for/accept incoming communication
$sock = socket create(AF_INET, SOCK_STREAM, 0);
socket_bind($sock, $address, $port) or die('Could not bind to address');
socket_listen($sock) ;
$client = socket_accept($sock);
// read input data from client device in 1024 byte blocks until end of message
do {
   $input = "" ;
   $input = socket_read($client, 1024);
   $data .= $input;
} while($input != "");
// parse data to extract variables
$obj = json_decode($data, true);
// store input data in a user profiles database
mysql_connect("201.408.185.132",$DBserver,$password); // access database server
mysql_select("UserProfile.SQL"); // select database to append
mysql_query("INSERT INTO ProfilesTable (transmission)
VALUES ($data)"); // add data to ProfilesTable table in UserProfile database
mysql_close("UserProfile.SQL"); // close connection to database
?>
```

In some implementations, the user and/or client device may provide a render request 303f including data such as those discussed above for the hosting and/or app servers. For example, an Adobe® Flash object may include ActionScript™ 3.0 commands to generate a HTTP POST message including information such as, but not limited to, an Internet Protocol ("IP") address of the requesting client device, a name of the object including the visualization to be rendered, information on quality of an image to be rendered (e.g., image quality, image height/width in pixels, image format, etc.), and an indication of an action to perform on the rendered image (e.g., e-mail to specific e-mail address(es), post on, e.g., a Facebook® profile page/wall, store on server, etc.), and/or the like. Exemplary ActionScript™ 3.0 commands to generate and send a render request message, including render details encoded in JSON format, are provided below:

```
// import required packages
import.com.adobe.serialization.json.JSON;
import flash.events.Event;
import flash.net.URLLoader;
import flash.net.URLRequest;
import flash.net.URLRequestMethod;
Import flash.net.URLvariables;
// generate message body (in JSON format)
var dat: = Array new Array( );
    dat.push( {field_name: "ip_address", value: "78.213.89.93"} );
    dat.push( {field_name: "object_name", value: "pokerapp.swf"} );
    dat.push( {field_name: "img_format", value: "jpeg"} );
    dat.push( {field_name: "img_max_dim", value: "90"} );
    dat.push( {field_name: "img_quality", value: "85"} );
var msg: URLVariables = new URLVariables ( );
    msg.data = JSON.encode(dat) ;
// set up HTTP POST message details
var req: URLRequest = new URLRequest ( );
    req.method = URLRequestMethod.POST;
    req.data = msg;
    req.url = "www.appserver.com/renderrequest.php";
// send HTTP POST message to server
1dr.addEventListener(Event.COMPLETE, handleServerResponse);
1dr.load(req) ;
```

The server obtaining the render request message from the client device may parse the body of the render request message, extract the information to the render request, and store 303g the information pertaining to the render request in a queue database 305d. For example, with reference to the example above, a PHP script executing on the server may obtain the HTTP(S) POST message, parse the JSON-encoded message body, extract the information into PHP variables, and store the details of the render request to a database using PHP/SQL commands. An exemplary listing, written substantially in the form of PHP/SQL commands, to parse and extract JSON-encoded data from a message sent from a client device, and store the data to a queue database, is provided below:

```
<?PHP
// parse data in $dat to extract data into array
$obj = json_decode($dat, true);
// store extracted array data in a render request queue database
mysql_connect ("201.408.185.132", $DBserver, $password); //
access database server
mysql_select ("RenderRequest.SQL"); // select database to append
mysql_query ("INSERT INTO RequestTable (timestamp, ip, app, format,
    dim, quality)
VALUES (time( ), $obj["ip_address"], $obj["object_name"],
$obj["img_format"],
    (int)$obj ["img_max_dim"], (int)$obj ["img_quality"] )"); // add data to
    Request table in RenderRequest database
mysql_close("RenderRequest.SQL"); // close connection to database
?>
```

In some implementations, a computing server 306, app server 304 and/or hosting server 303 may monitor the number of requests stored in the queue database 305d. In some implementations, a server may trigger processing of the render requests based on monitoring the queue database. For example, the server may trigger render request processing upon the number of pending render requests reaching a threshold value. In some implementations, each render request stored in the queue database may have a priority value associated with it. In some implementations, the server may monitor the priority values, and a time elapsed since the render request was stored in the queue database, and trigger the processing of the render request based on its priority value and the time elapsed since the request was stored in the queue database. The priority value may be determined in various implementations by numerous factors, including, but not limited to, the IP address of the client device submitting the request, a time elapsed since the request was stored in the queue database, details of the render request (e.g., name of the app including the visualization to be rendered), a user ID of the user submitting the render request, characteristics of a social graph of the user submitting the render request (e.g., number of social network friends, number of social gaming friends for a gaming app, depth of the user's social graph), an amount of time the user has spent using the app that includes the visualization, a frequency with which the visualization has occurred within the app when used by the user, a frequency of social activity of the user (e.g., such as Facebook® profile/wall postings, blogging, Twitter™ tweets of the user, etc.) and/or the like. In some implementations, upon determining that the render request needs to be processed, the computing sever 306 may obtain user profile data 303i (e.g., in-use data provided by the user/client while the user is using the app) from the user profile database 305a, and/or data from the user's client device 302. For example, the computing server may obtain a listing of all the user interactions with the app, and may recreate the state of the app executing on the user's client device by sequentially providing inputs into a copy of the app executing on the computing server matching the inputs provided by the user to the app executing on the user's client device.

In other implementations, the computing server may provide an instruction to the user's client device to freeze the state of the app, and provide the app and/or data structures stored on the user's client device related to the app. For example, in some implementations, the client device may have stored thereon a data structure representative of a scalable vector illustration, e.g., a Scalable Vector Graphics ("SVG") data file. The data structure may include, for example, data representing a vector illustration. For example, the data structure may describe a scalable vector illustration having one or more objects in the illustration. Each object may be comprised of one or more paths prescribing, e.g., the boundaries of the object. Further, each path may be comprised of one or more line segments. For example, a number of very small line segments may be combined end-to-end to describe a curved path. A plurality of such paths, for example, may be combined in order to form a closed or open object. Each of the line segments in the vector illustration may have start and/or end anchor points with discrete position coordinates for each point. Further, each of the anchor points may comprise one or more control handles. For example, the control handles may describe the slope of a line segment terminating at the anchor point. Further, objects in a vector illustration represented by the data structure stored on the client device may have stroke and/or fill properties specifying patterns to be used for outlining and/or filling the object. Further information stored in the data structure may include, but not be limited to: motion paths for objects, paths, line segments, anchor points, etc. in the illustration (e.g., for animations, games, video, etc.), groupings of objects, composite paths for objects, layering information (e.g., which objects are on top, and which objects appear as if underneath other objects, etc.) and/or the like. For example, the data structure stored on the user's client and including data on the scalabale vector illustration may be encoded according to the open XML-based Scalable Vector Graphics "SVG" standard developed by the World Wide Web Consortium ("W3C"). An exemplary XML-encoded SVG data file, written substantially according to the W3C SVG standard, and including data for a vector illustration comprising a circle, an open path, a closed polyline composed of a plurality of line segments, and a polygon, is provided below:

```
<?XML version = "1.0" standalone = "no">
<!DOCTYPE svg PUBLIC "-//W3C//DTD SVG 1.1//EN"
  "http://www.w3.org/Graphics/SVG/1.1/DTD/svg11.dtd">
<svg width = "100%" height = "100%" version = "1.1"
  xmlns="http://www.w3.org/2000/svg">
    <circle cx="250" cy="75" r="33" stroke="blue"
    stroke-width="2" fill="yellow"/>
    <path d="M250 150 L150 350 L350 350 Z" />
    <polyline points="0,0 0,20 20,20 20,40 40,40 40,80"
    style="fill:white;stroke:green;stroke-width:2"/>
    <polygon points="280,75 300,210 170,275"
    style="fill:#cc5500;
    stroke:#ee00ee;stroke-width:1"/>
</svg>
```

The client device may provide the XML-encoded SVG data via one or more HTTP(S) POST messages and/or using an SSL connection to the server, as illustrated in examples provided above in this disclosure with regard to, e.g., generating and sending a render request message. In some implementations, using the data obtained from the user profile database 305a and/or client device 302, the computing server may recreate an app state identical to the app state on the client device. The app state may include the complex visualization (or visualization similar to the complex visualization) for which the user originally submitted the render request. Upon recreating an app state identical or similar to that on the client device, the computing server may process the render request associated with the obtained app and/or data by rendering the complex visualization recreated within the app executing on the computing server. The computing server may obtain the rendered image as a render result 303j, and may provide the render result for storage and/or further action to other computing, app and/or hosting servers. For example, the computing server may host an Adobe® Flash object including ActionScript™ 3.0 commands to render the visualization included in the app, and provide the rendered visualization for a process on the same computing server and/or other server/client. Exemplary commands, written substantially in a form adapted to ActionScript™ 3.0, for rendering a visualization of a scene within an Adobe® Flash object, scaling the image to appropriate dimensions, encoding the image in a predetermined format and with specified image quality, and providing the image to a remotely executing PHP script for storage and/or other actions are provided below:

```
// import necessary modules/functions
import flash.display.BitmapData;
import flash.geom.*;
import com.adobe.images.JPGEncoder;
// generate empty thumbnail bitmap with appropriate dimensions
var bitSource:BitmapData = new BitmapData
(sketch_mc.width, sketch_mc.height);
// capture snapsot of movie clip in bitmap
bitSource.draw(sketch_mc);
var imgSource:Image = new Image( );
imgSource.load(new Bitmap(bitSource, "auto", true) );
// generate scaling constants to generate thumbnail with 90 pixels maximum
  dimension
```

```
var res:Number = 90 / max(sketch_mc.width, sketch_mc.height);
var width:Number = round(sketch_mc.width * res);
var height:Number = round(sketch_mc.height * res);
// scale the image
imgSource.content.width = width;
// JPEG-encode bitmap for passing to PHP script, 85% JPEG compression
image
  quality
var jpgEncoder:JPGEncoder = new JPGEncoder(85);
var jpgStream:ByteArray = jpgEncoder.encode(jpgSource);
// Pass JPEG-encoded bitmap to PHP script
var header: URLRequestHeader = new URLRequestHeader("Content-type",
  "application/octet-stream");
var jpgURLRequest:URLRequest = new
  URLRequest("jpg_encoder_download.php?name=sketch.jpg");
jpgURLRequest.requestHeaders.push(header);
jpgURLRequest.method = URLRequestMethod.POST;
jpgURLRequest.data = jpgStream;
navigateToURL(jpgURLRequest, "_blank");
```

In some implementations, the server obtaining the render result 303j may generate a message 303k (e.g., newsfeed, Facebook® wall posting, blog posting, e-mail message, multimedia messaging service "MMS" message, etc.) including the render result 303j, and may provide the message 303k for an app server, hosting server, client device and/or user. For example, a server may be executing a PHP script including commands to post the render result image to a wall of, e.g., a Facebook® user. An exemplary listing, written substantially in the form of PHP commands, for posting a render result image to the wall of a Facebook® user is provided below:

```
<?PHP
// save image stored in $img_src variable to file 'thumbnail.jpg' on server
$success = imagejpeg($img_src, 'thumbnail.jpg');
// generate one-time session for Facebook ® access
$fb = new FacebookRestClient($fb_apikey, $fb_secret);
$result = $fb -> call_method('facebook.auth.getSession',array ('auth_token'
  =>
  $one_time_token, 'generate_session_secret' => true) );
$session_key = $result['session_key'];
require_once('facebook-platform/php/facebook.php');
$facebook -> new Facebook($fb_apikey, $fb_secret);
$facebook -> api_client -> session_key = $session_key;
// select user on whose wall post message
$fetch = array('friends' => array('pattern' => '.*', 'query' => "select uid2
  from friend where uid1={$user}") );
$facebook -> api_client -> admin_setAppProperties(array('preload_fq1' =>
  json_encode($fetch) ) );
// prepare post message
$message = ['Check out' $user "'s cool poker hand!'];
$attachment = array('media' => array(array('type' => 'image', 'src' =>
  $img_src, 'href' => $img_href) ) );
$attachment = json_encode($attachment);
// post message
$facebook -> api_client_stream -> stream_publish($message, $attachment);
?>
```

FIGS. 4A-F are of exemplary screenshots illustrating aspects of rich multimedia object user interface features in some embodiments of the DOR. In some implementations, the user may desire to have rendered (e.g., for posting on a blog, social network profile, etc.) a visualization included in the app executing on the client device. In some implementations, the app may include one or more render request submission features. For example, the app may provide user interface features designed to facilitate user submission of render requests. Such render request submission features may, in some implementations, be triggered based on various events including, but not limited to: user achieving a high score, user completing a stage in a game, user achieving an unusual result, the user activating a user interface element to create a render request, and/or the like. In some implementations, a client application 400 may include a visualization 401 (e.g., computed with reduced quality by the client device). The client application may provide the user an option to submit a render request for rendering a high-quality image, video, etc. of the visualization included in the client app. For example, the client application may be configured so that an options menu (e.g., 402) appears for the user when the user provides an appropriate input (e.g., user right-clicks within the client app). In some implementations, the options menu may include an option to generate a render request (e.g., "Render This Scene" 403). The client application may be configured so that the user can select the option, e.g., via a keyboard entry, mouse click, finger gap, touch gesture, etc. In response to the user selecting the option to generate the render request, the client application may provide a user interface ("UI"), e.g., 404, including one or more user interface features (e.g., 404,a-g, 407a-g) to generate and submit a render request. For example, the client application may include UI features to select a format for a rendered image (e.g., dropdown list box 404a), select an image quality (e.g., dropdown list box 404b); select an image size (e.g., dropdown list box 404c) and/or the like. The UI may include, for example, a text field (e.g., 404d) where the user can enter a note to be attached (e.g., as metadata) to the rendered image. The UI may include a plurality of submission UI elements (e.g., submit buttons 404e-g) that the user may activate upon entering the required render request information into the UI, In response to the user activating one or more of the submission UI elements, the client application may submit render requests to publications associated with the user-activated submission UI elements (e.g., Facebook®, Digg™, Reddit®, Google Buzz™, Myspace®, Blogger™, YouTube®, and/or the like). In some implementations, the client app may have stored the user login credentials for each of the publications that are associated with the UI submission elements. In such implementations, the client application may utilize the stored login credentials to obtain access to secured publications, and then submit the user-provided render requests to the publications.

In some implementations, the client app may allow the user to select a portion of the visualization for render request submission. For example, the client app may be configured so that the user can click (e.g., 405) a mouse input device at a point within the visualization, drag the mouse pointer for the mouse, and release the mouse pointer at a desired location. In response, the client app may determine a closed boundary (e.g., 406) within the visualization using the points at which the mouse was clicked and/or released ("boundary anchor points"). The client app may provide the coordinates of the boundary anchor points as part of the render request. The server processing the render request may then generate a visualization of the user-selected portion of the visualization included in the client app. In some implementations, the client app may provide the user with a UI for submission of video rendering requests (e.g. 407). Such a UI may include UI elements (e.g., 407a-d) for the user to enter file format (e.g., 407a) for movies, animations, etc., video length (e.g., 407b), video quality (e.g., 407c), and/or the like. The UI may provide elements (e.g., 407d) where the user may enter information about the video (e.g., to be stored as metadata in the video file). Upon providing the require video render request information, the user may activate one or more submission UI elements (e.g., submit buttons 407e-g) to indicate that the app facility should submit the rendered video to publications associated with the UI submission elements. The client app may also provide the user with the option to select (e.g., 408) a region within the visualization (e.g., 409) to submit for video rendering.

In some implementations, upon obtaining the user's activating a submission UI element, the client application may determine whether additional information is required, and request the information from the user if necessary. For example, the client application, may provide one or more dialog boxes (e.g., 410) requesting additional information before render request submission to a server. For example, the client application may request the user to provide (e.g., 411) a user name and/or ID for e.g., a target user social networking profile page, blog, webpage, etc. to which the rendered results may be posted by the server. The client application may also request the user to provide an indication (e.g., 412) of a template according to which the server should format the render results for posting. The client application may also provide the user with one or more elements (e.g., 413, 'Add a note', 409, etc.) using which the user may provide a note, message, comment, etc. to attach with the render results for posting by the server. Upon providing the necessary information, the user may confirm the render request by activating an element (e.g., 414) provided by the client application. The client application may then submit the user-provided render request and associated details to the server, e.g., via a HTTP(S) POST message as discussed above with reference to FIG. 3. Upon obtaining the render request, the server may process the render request and generate a render result (e.g., hyperlinked thumbnail 418, high-quality rendered image/video 419, etc.), as discussed above with reference to FIG. 3. The server may use the user-provided target user information (e.g., user-selected format template, user notes, comments, messages, etc.) to generate a publishing element (e.g., 417-418) using the render result and the user-provided information. The server may publish the publishing element to a site (e.g., 415) for the target user (e.g., 416), for example using PHP commands such a those presented above in the discussion of FIG. 3. The server may also attach the user-provided information (e.g., user entries into 404d, 407d, 413, etc.) as part of the publishing element (e.g., 417, 420).

Figure 5:
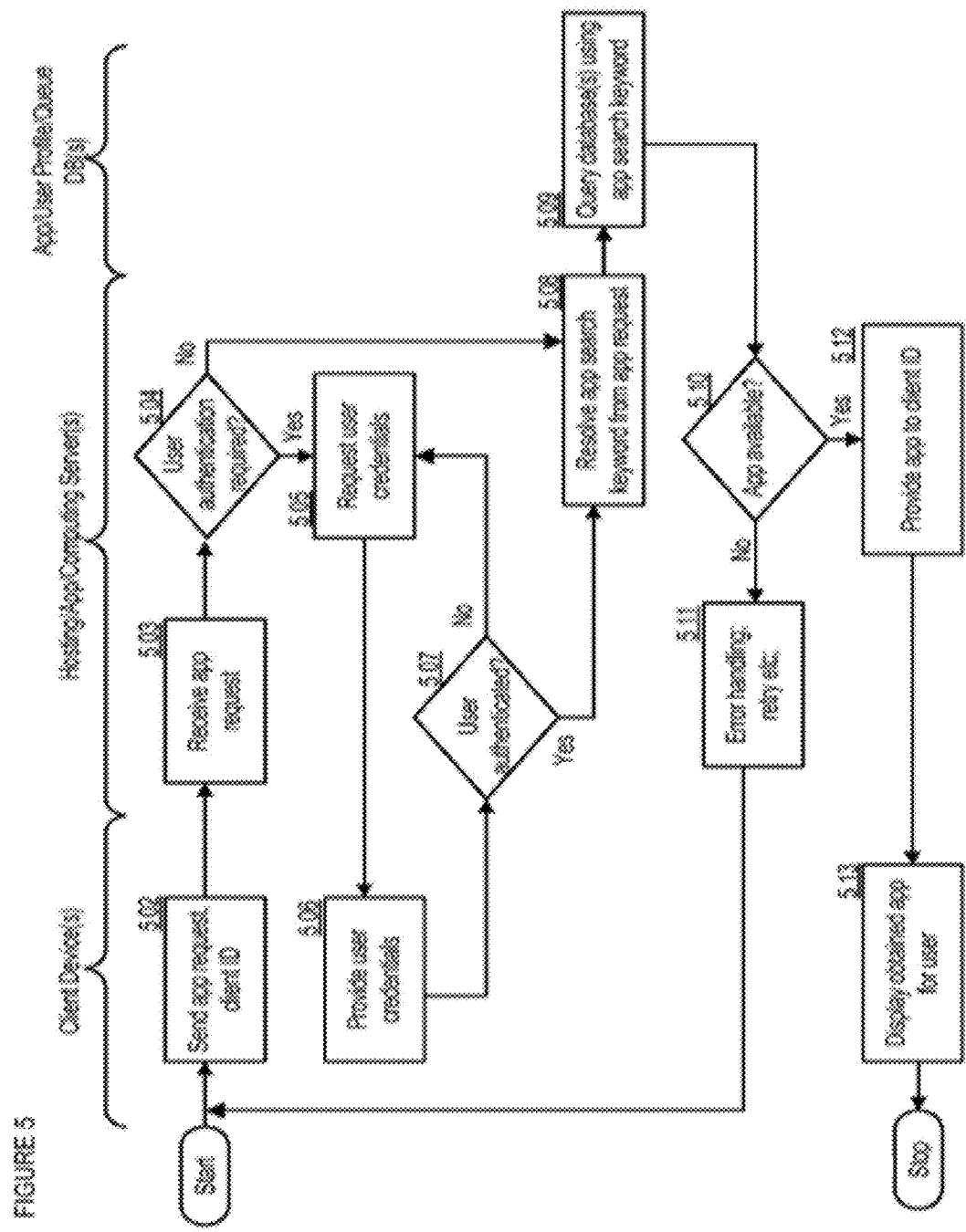
FIG. 5 is of a logic flow diagram illustrating aspects of distribution of rich multimedia objects in some embodiments of the DOR.

FIG. 5 is of a logic flow diagram illustrating aspects of distribution of rich multimedia objects in some embodiments of the DOR, e.g., a client initialization component. In some implementations, a user and/or client may provide a request 502 for an app for a hosting and/or app server. For example, a web browser executing on the client may provide a HTTP(S) GET message requesting a HTML page including JavaScript™ commands to embed an Adobe® Flash object including the application for the user in the HTML page, as illustrated in the example provided with reference to FIG. 3. The server receiving 503 the app request may determine (e.g., 504, option 'Yes') that that the user be authenticated in order to use the app, and request user credentials 505 from the user. For example, in some implementations, the server may provide an HTML page with an input form for the user to provide user credentials, and request 505 user credentials. The user may input the user credentials (e.g., 506) into the HTML input form, and press a submit button included in the HTML form. Upon pressing the submit button, the web browser of the client device may generate a HTTP(S) POST message including the user-provided form inputs for the server. As another example, in some implementations, the server may provide an Adobe® Flash object including ActionScript™ 3.0 commands to request (e.g., 505) the user to provide user credentials (e.g., 506) by entering the credentials into input text fields included in the Adobe® Flash object, and may provide the user-entered credentials for a server via a HTTP(S) POST message to the server. Exemplary Action-Script™ 3.0 commands for providing a HTTP(S) POST message are provided below:

```
// generate HTTP GET message with username, password and
application name
var dataOut:LoadVars = new LoadVars ( );
function checkUser( ) :Void {
    dataOut.username = username.text;
    dataOut.password = password.text;
    dataOut.appname = "poker";
    dataOut.send ("authenticate.php", "newwin", "GET");
}
// send HTTP GET message on 'checkUser' button mouse click
enterbtn.addEventListener ("click", checkUser);
```

Upon obtaining the user credentials, the server may query a user profile database to determine whether the user is authenticated (e.g., 507) to use the app. For example, the server may implement a PHP script including commands to query a user profile database for user authentication details, and may compare the authentication details obtained via querying the database with the user-entered credentials. Exemplary PHP commands to query a user profile database to determine whether a user is authentication to use an app are provided below:

```
function authenticate ($DBserver, $pgmid, $pgmpass, $userid, $userpass,
    $appname) {
mysql_connect ($DBserver, $pgmid, $pgmpass); // PHP script accesses
database
    server
mysql_select_db("UserProfile.SQL"); // select database to search
$query = "SELECT URL FROM ProfilesTable WHERE userid LIKE
% $userid AND
    password LIKE '%' $userpass AND appname LIKE '%' $appname;
    // create query
    for user permissions and game URL in the ProfilesTable table with
    'userid'
    and 'userpass' as search terms
$gameURL = mysql_query ($query); // query for user existence and
permissions
return $gameURL;
}
```

In some implementations, if the user is authenticated (e.g., 507, option Yes), the server may query an app database for an app to provide for the user, based on the details of the user's app request (e.g., 508 and 509). If the app is not available (e.g., 510, option No), the server may generate an error message (e.g., 511) for the user, and may provide an alternate resource and/or method for the user to obtain an app. If the app is available, the server may provide the app for the user to the client device (e.g., 512), using e.g., an IP address for the client device included in the app request message originally provided by the user. The client, upon obtaining the app may execute/display 513 the app for the user. For example, the client may obtain a Shockwave Flash (*.swf) object from the server, and may invoke an Adobe® Flash web browser pug-in to process and display the *.swf object for the user.

Figure 6:
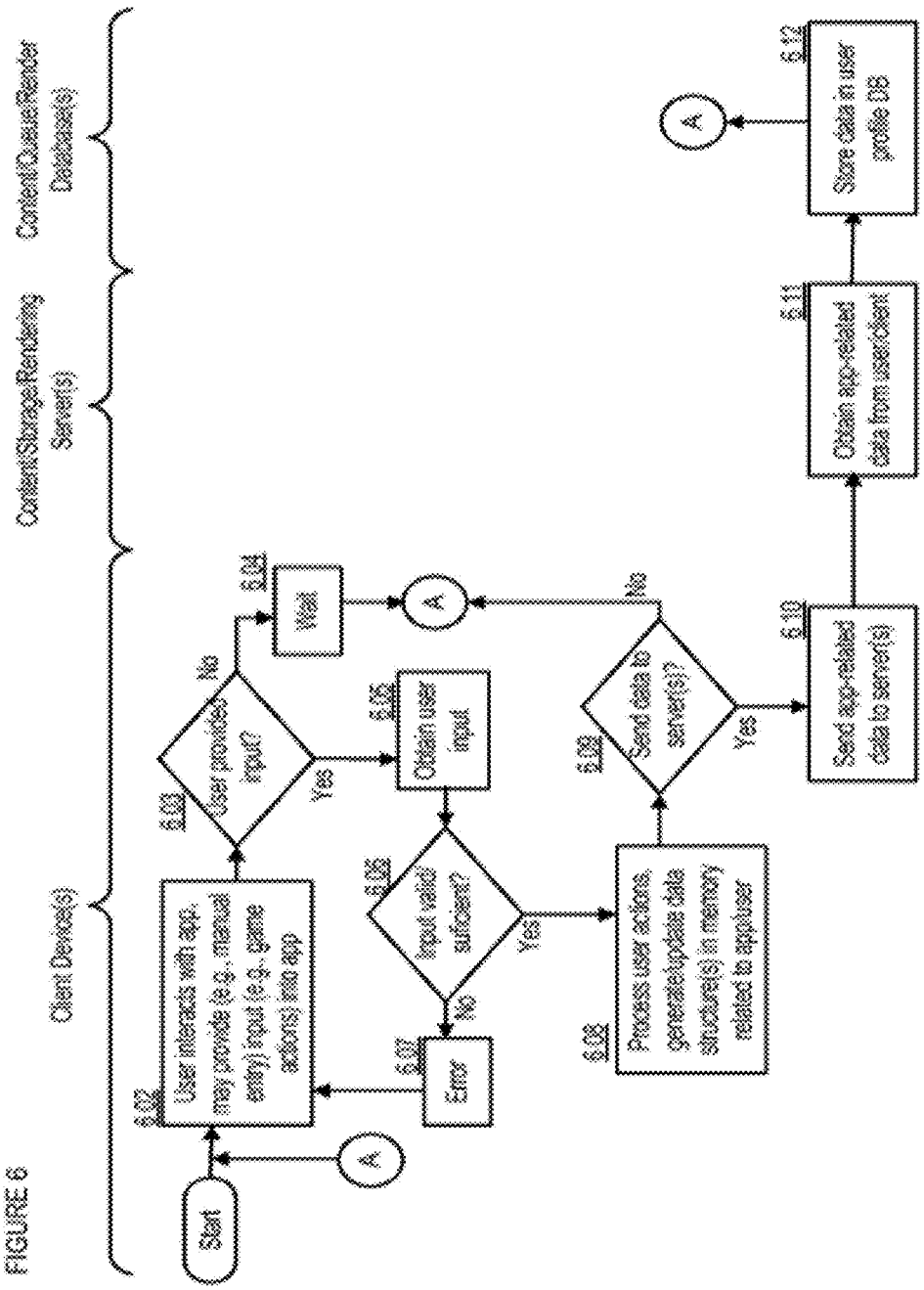
FIG. 6 is of a logic flow diagram illustrating aspects of user interaction with rich multimedia objects in some embodiments of the DOR.

FIG. 6 is of a logic flow diagram illustrating aspects of user interaction with rich multimedia objects in some embodiments of the DOR, e.g., a client transaction component. In some implementations, the app may include interactive features for the user. For example, the app may be configured to accept user input/feedback via a variety of mechanisms including, but not limited to, keyboard entry, mouse input, touch input, touch gestures, voice commands, auto-form filling, and/or the like. The app may provide a variety of user interfaces configured to accept such input from the user including, but not limited to, command line keyboard entry interfaces, graphical user interfaces, touch-sensitive interfaces, and/or the like. In some implementations, the user may interact 602 with the app and provide input into the app. For example, the user may provide input as part of a gaming application, a social application (e.g., chat room, instant messaging, etc.), information resource selection, and/or the like. The client device may detect input from the user 603. For example, the client may include hardware resources (e.g., keyboard, mouse, etc.) that provide triggers when a user manipulates the input hardware resources. Upon detecting user input (e.g., 603, option Yes), the client may obtain such user input 605, and determine whether the provided input is sufficient for the action and/or circumstances within the app at the time of user input. For example, the app may be configured to only accept user credentials input if the user credential input is longer than a predetermined number of characters. If the input is determined to be insufficient (e.g., 606, option No), the client may indicate 607 to the user to provide further input, and may wait 604 for the requested user input to be provided. If the input is determined to be sufficient (e.g., 606, option Yes) for the app to complete the action for which it requested/is provided the input, the app may incorporate the input into the interactive user experience, and proceed with instructions execution according to the satisfactory user input (e.g., 608). In some implementations, the client executing the app may generate, maintain, update and/or store data pertaining to the user's interaction with the app (e.g., an app state, an app data structure, a block of memory with data variables, a Flash movie clip, etc.). For example, the app may store an XML data file including vector illustrations encoded according to the W3C SVG standard, such as the data structure illustrated in the example provided with reference to FIG. 3. In some implementations, the client may determine whether to provide data stored on the client for a server 609. If the client determines that data should be provided for the server (e.g., 609, option Yes), the client may prepare the data for transmission and provide the data for the server 610, for example, via a HTTP(S) POST message and/or secure SSL connection with the server as discussed previously. The server may obtain 611 the data provided by the client, and may store the data in a user profile database (e.g., 612). For example, the server may utilize PHP/SQL commands to obtain the data provided by the client, extract information variables from the provided data, connect to a database, and store the data and/or extracted information variables in the database for later use. In some implementations, the user may interact with the app executing on the client in a continuous manner, and the client may continuously transmit user data to a server for storage in a database and/or further processing.

FIGS. 7A-B are of logic flow diagrams illustrating inventive aspects of distributed rendering of visualizations in rich multimedia objects in some embodiments of the DOR, e.g., a render request processing component. In some implementations, generation of a request for rendering of a visualization included in an app being used by a user on a client may be triggered. The render request generation may be triggered in various implementations in a number of ways (e.g., 702 and 704). For example, the user may desire and request generation of a rendered image, the client, via the app, may initiate render request generation upon the user reaching a milestone within the app (e.g., user achieving a high game score, user using the app for a predetermined length of time/longest amount of time, etc.), and/or a computing, app and/or hosting server may initiate the trigger for render request generation, e.g., based on analyzing user data stored in the user profile database.

Upon detecting a trigger (e.g., 703, option Yes) from the trigger source for render request generation, the server may generate 705 a render request record, and store the render request in a queue database (e.g., 706). The app facility may continue to detect, analyze, and accept render request triggers from users, clients, servers and/or other entities affiliated with the app facility. For example, as illustrated in examples provided previously with regard to FIG. 3, a server may execute a PHP/SQL command set configured to obtain a HTTP(S) POST message from a client and/or other affiliated entity, parse the message to extract render request details, and store the extracted render request details in a database.

In some implementations, the server may determine that a render request needs to be processed, and may initiate processing of the render request. For example, the server may monitor the number of requests stored in the queue database and may trigger processing of the render request based on monitoring the queue database. In some implementations, the server may calculate priority values for the pending render requests, and select/obtain the render request (e.g., 707) with the highest priority for processing. For example, the server may calculate priority values and select a render request for processing as described further below with reference to FIG. 7. The server may obtain the details of the render request 708 (e.g., IP address of the client, user ID of the user, app name, time of submission of the render request, etc.) by querying the queue database for the record of the render request selected for processing, and analyzing the obtained record to determine the render process requirements 708 (e.g., Adobe® Flash object to render, app to obtain from the app database, where to report the results of render processing, etc.). The server may generate queries to the user profile database for the data required to process the render request (e.g., 709). For example, the server may request a record of all user input that was provided to the app by the user from the user profile database (e.g., 710). In such an example, in some implementations, the server may recreate the state of the app on the user's client by sequentially providing the user input as obtained from the user profile database. In other implementations, the server may determine that the state of the app on the user's client resulted from other inputs besides that available in the user profile database (e.g., 711, option No). For example, the user may be using a massively multiplayer online game app, and the server may determine that the visualization included in the app executing on the user's client may not be recreated using only the data available in the user profile database. In such implementations, the server may generate a request 712 for the user/client to provide the data pertaining to the app stored in the client for the server to process the render request. For example, the server may provide a HTTP(S) GET message to the client using the IP address of the client obtained from the record of the render request, and request a data structure associated with the app using the HTTP(S) GET message. Upon obtaining the data request 713 from the server, the user and/or client may, in some implementations, freeze all activity pertaining to the app on the client. The client may obtain a snapshot 714 of the data structure associated with the app, and provide 715 the data structure for the server. For example, a web browser (and/or app including ActionScript™ 3.0 commands) executing on the client may obtain the HTTP(S) GET message (of the example above), process the GET message, and provide the data stored on the client as requested by the server in the form of a HTTP(S) POST message to the server based on the HTTP GET(S) message provided by the server. For example, the client may utilize commands similar to the examples provided illustrating such messaging abilities with reference to FIG. 3. In some implementations, upon obtaining the data required for processing the render request (e.g., 716), the server may generate the rendered image 717 according to the details of the render request obtained from the queue database. For example, the server may be executing ActionScript™ 3.0 commands included in an Adobe® Flash object stored on the server. The server may also be executing a PHP script including commands to communicate with external computing/database systems (clients, servers, hosting servers for message postings, etc.) and/or the local file storage system of the server. The PHP script may be configured to obtain data from the databases, users, clients and/or other affiliated entities, as illustrated in the examples of HTTP(S) POST messaging and secure SSL communication provided previously with reference to FIG. 3. Further, the ActionScript™ 3.0 commands may, for example, be configured to obtain variables from the PHP script. Exemplary commands to obtain variables from a PHP script, written substantially in the form of ActionScript™ 3.0, are provided below:

```
import flash.events.*;
import flash.net.*;
// Prepare request
var request:URLRequest = new URLRequest("\localhost\communicator.php");
request.method = URLRequestMethod.GET;
var loader:URLLoader = new URLLoader( );
loader.dataFormat = URLLoaderDataFormat.VARIABLES;
loader.addEventListener (Event.COMPLETE, completeHandler);
loader.load (request);
```

The server may render the image 717 according to the render request based on the data obtained from the user, client and/or user profile database. For example, the server may utilize ActionScript™ 3.0 commands similar to those discussed in the example provided previously with reference to FIG. 3. Upon rendering the image, the server may query a database for a publishing template 718 to report the results of the render processing. For example, the server may obtain a template string for posting the render results on, e.g., a wall of a Facebook® user. The server may generate a publishing element (e.g., newsfeed, Facebook® wall/profile posting, blog posting, e-mail message) using the rendered image 719, and provide the publishing element to the publisher 720. For example, the server may attach the rendered image to a message for posting on a sharing site (e.g, a Facebook®, Digg™, Reddit®, Google Buzz™, Myspace®, Blogger™, YouTube®, and/or the like) using PHP commands such as the exemplary commands provided above with reference to FIG. 3.

Figure 8A:
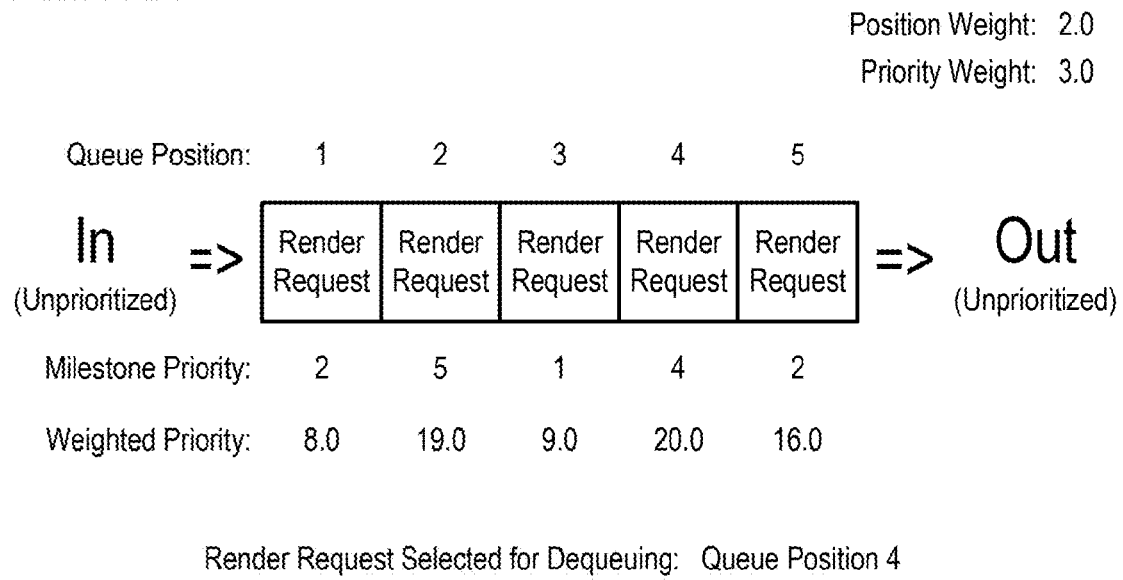
FIGS. 8A-B are of block diagrams illustrating aspects of distributed object render request management in some embodiments of the DOR.
Figure 8B:
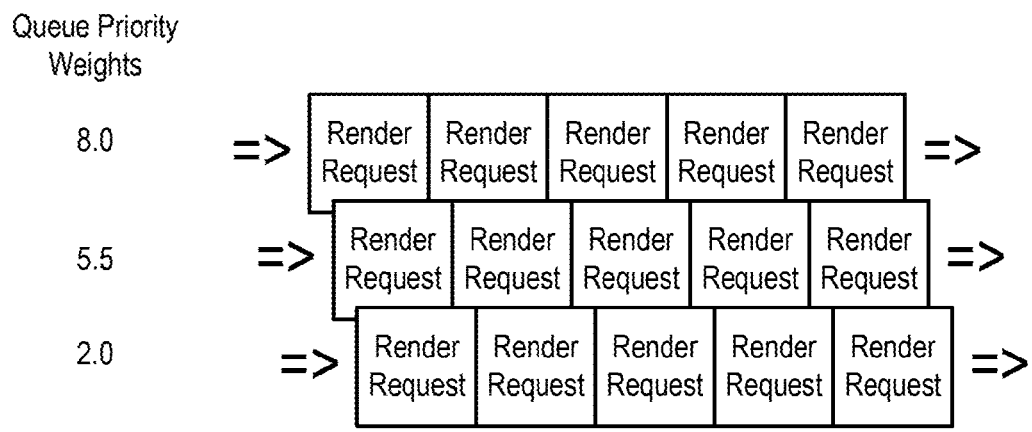

FIGS. 8A-B are of block diagrams illustrating aspects of distributed object render request management in some embodiments of the DOR, e.g., a request management component. In some implementations, the computing server may select the next render request to be processed according to a priority queuing process. In some implementations, the computing server may determine the next render request to process based on the order (e.g., using a timestamp submitted with each render request) in which the render requests entered the render request queue and a priority value assigned to each of the render requests (e.g., based on an originating IP address associated with each render request). Each render request in a queue may be assigned a queue number indicative of the order in which the render requests entered the queue and a priority value indicative of the importance attached to processing the render request. In some implementations, the computing server may determine the render request priority values based on a number of factors including, but not limited to, render request ID, originator ID, and/or the like. In some implementations, the computing server may assign relative importance to the order in which render requests entered the queue and the priority value assigned to any particular render requests using position weights and/or priority weights. For example, a net priority value of a render request in a queue may be determined by the computing server as the weighted sum of the queue position and the render request priority, wherein the weights are the position weight and the priority weight, as illustrated in FIG. 8A:

Net Render Request Priority Value = Request Queue Position * PositionWeight +
Request Priority * Priority Weight;

In such implementations, the render request next selected for processing by the computing server may be identified as the render request having the highest net render request priority value. In further implementations, the computing server may utilize multiple queues for render requests, such as the non-limiting exemplary illustration in FIG. 8B. In some implementations, each queue may be assigned a queue priority weight relative to the other queues for render requests. In such implementations, the net priority value of a render request may be weighted by the weight assigned to its render request queue:

Net Render Request Priority Value = (Request Queue Position * Position Weight +
Request Priority * Priority Weight) * Queue Priority Weight;

In some such implementations, the next render re quest selected by the computing server for processing among the render requests in all the queues may be the render request having the highest net render request priority value, including the weighting assigned to each of the render queues in the queue database.

DOR Controller

Figure 9:
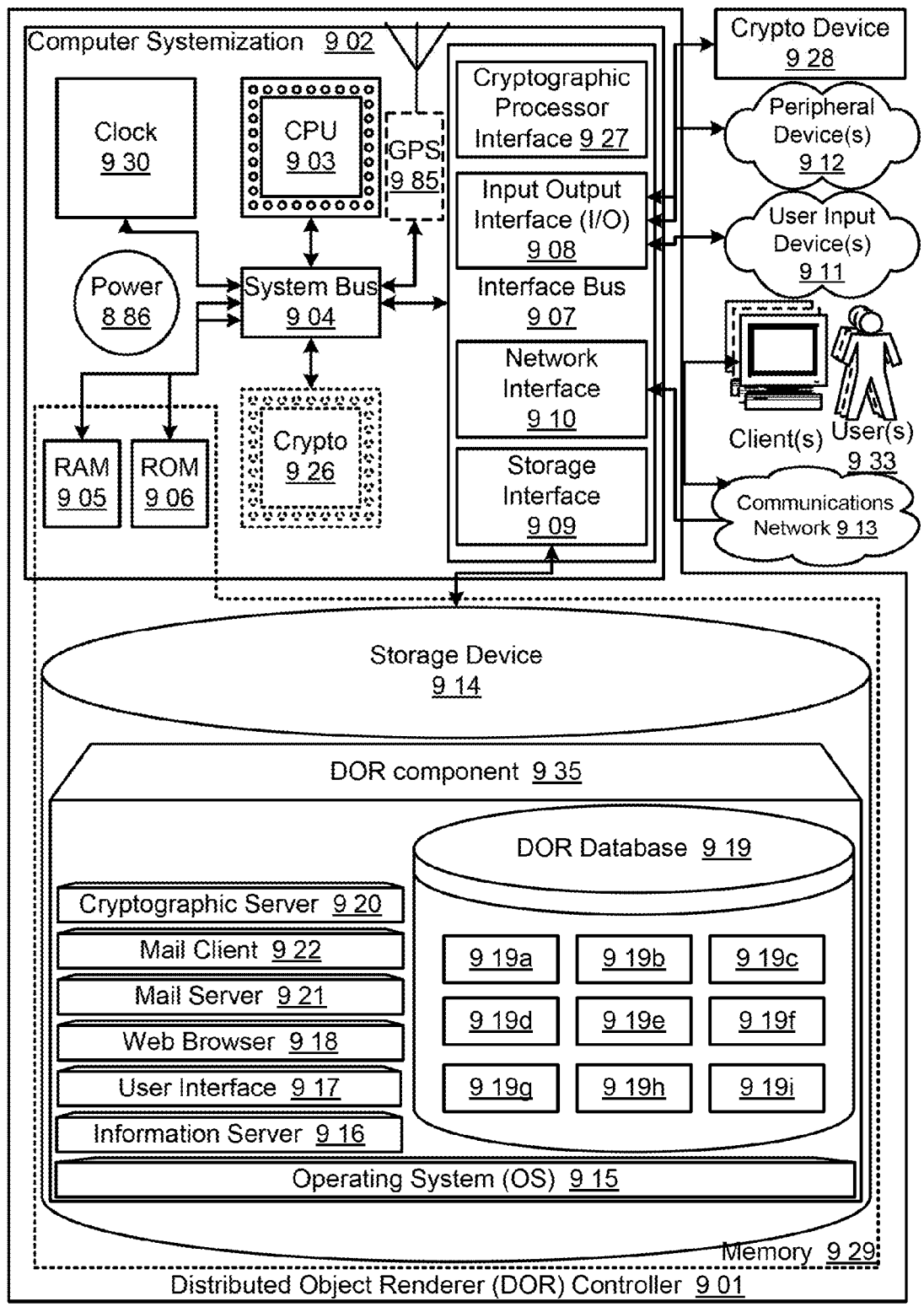
FIG. 9 is of a block diagram illustrating embodiments of the DOR controller.

FIG. 9 illustrates inventive aspects of a DOR controller 901 in a block diagram. In this embodiment, the DOR controller 901 may serve to aggregate, process, store, search, serve, identify, instruct, generate, match, and/or facilitate interactions with a computer through enterprise and human resource management technologies, and/or other related data.

Typically, users, which may be people and/or other systems, may engage information technology systems (e.g., computers) to facilitate information processing. In turn, computers employ processors to process information; such processors 903 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 929 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the DOR controller 901 may be connected to and/or communicate with entities such as, but not limited to: one or more users from user client devices 911; peripheral devices 912; an optional cryptographic processor device 928; and/or a communications network 913. For example, the DOR controller 901 may be connected to and/or communicate with users operating client device(s) including, but not limited to, personal computer(s), server(s) and/or various mobile device(s) including, but not limited to, cellular telephone(s), smartphone(s) (e.g., iPhone®, Blackberry®, Android OS-based phones etc.), tablet computer(s) (e.g., Apple iPad™, HP Slate™ etc.), eBook reader(s) (e.g., Amazon Kindle™ etc.), laptop computer(s), notebook(s), netbook(s), gaming console(s) (e.g., Nintendo® DS etc.), portable scanner(s) and/or the like.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The DOR controller 901 may be based on computer systems that may comprise, but are not limited to, components such as: a computer systemization 902 connected to memory 929.

Computer Systemization

A computer systemization 902 may comprise a clock 930, central processing unit ("CPU(s)" and/or "processor(s)" (these terms are used interchangeably throughout the disclosure unless noted to the contrary)) 903, a memory 929 (e.g., a read only memory (ROM) 906, a random access memory (RAM) 905, etc.), and/or an interface bus 907, and most frequently, although not necessarily, are all interconnected and/or communicating through a system bus 904 on one or more (mother)board(s) 902 having conductive and/or otherwise transportive circuit pathways through which instructions (e.g., binary encoded signals) may travel to effect communications, operations, storage, etc. Optionally, the computer systemization may be connected to an internal power source 886. Optionally, a cryptographic processor 926 may be connected to the system bus. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 529 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the DOR controller and beyond through various interfaces. Should processing requirements dictate a greater amount speed and/or capacity, distributed processors (e.g., Distributed DOR), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the DOR may be achieved by implementing a microcontroller such as CAST's R8051XC2 microcontroller; Intel's MCS 51 (i.e., 8051 microcontroller); and/or the like. Also, to implement certain features of the DOR, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the DOR component collection (distributed or otherwise) and/or features may be implemented via the microprocessor and/or via embedded components; e.g., via ASIC, coprocessor, DSP, FPGA, and/or the like. Alternately, some implementations of the DOR may be implemented with embedded components that are configured and used to achieve a variety of features or signal processing.

Depending on the particular implementation, the embedded components may include software solutions, hardware solutions, and/or some combination of both hardware/software solutions. For example, DOR features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the DOR features. A hierarchy of programmable interconnects allow logic blocks to be interconnected as needed by the DOR system designer/administrator, somewhat like a one-chip programmable breadboard. An FPGA's logic blocks can be programmed to perform the function of basic logic gates such as AND, and XOR, or more complex combinational functions such as decoders or simple mathematical functions. In most FPGAs, the logic blocks also include memory elements, which may be simple flip-flops or more complete blocks of memory. In some circumstances, the DOR may be developed on regular FPGAs and then migrated into a fixed version that more resembles ASIC implementations. Alternate or coordinating implementations may migrate DOR controller features to a final ASIC instead of or in addition to FPGAs. Depending on the implementation all of the aforementioned embedded components and microprocessors may be considered the "CPU" and/or "processor" for the DOR.

Power Source

The power source 886 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 886 is connected to at least one of the interconnected subsequent components of the DOR thereby providing an electric current to all subsequent components. In one example, the power source 886 is connected to the system bus component 904. In an alternative embodiment, an outside power source 886 is provided through a connection across the I/O 908 interface. For example, a USB and/or IEEE 1394 connection carries both data and power across the connection and is therefore a suitable source of power.

Interface Adapters

Interface bus(ses) 907 may accept, connect, and/or communicate to a number of interface adapters, conventionally although not necessarily in the form of adapter cards, such as but not limited to: input output interfaces (I/O) 908, storage interfaces 909, network interfaces 910, and/or the like. Optionally, cryptographic processor interfaces 927 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 909 may accept, communicate, and/or connect to a number of storage devices such as, but not limited to: storage devices 914, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 910 may accept, communicate, and/or connect to a communications network 913. Through a communications network 913, the DOR controller is accessible through remote clients 933 (e.g., computers with web browsers) by users. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed DOR), architectures may similarly be employed to pool, load balance, and/or otherwise increase the communicative bandwidth required by the DOR controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 910 may be used to engage with various communications network types 913. For example, multiple network interfaces may be employed to allow for the communication over broadcast, multicast, and/or unicast networks.

Input Output interfaces (I/O) 908 may accept, communicate, and/or connect to user input devices 911, peripheral devices 912, cryptographic processor devices 928, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless: 802.11a/b/g/n/x, Bluetooth, code division multiple access (CDMA), global system for mobile communications (GSM), WiMax, etc.; and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 911 may be card readers, dongles, finger print readers, gloves, graphics tablets, joysticks, keyboards, mouse (mice), remote controls, retina readers, trackballs, trackpads, and/or the like.

Peripheral devices 912 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the DOR controller may be embodied as an embedded, dedicated, and/or monitor-less (i.e., headless) device, wherein access would be provided over a network interface connection.

Cryptographic units such as, but not limited to, microcontrollers, processors 926, interfaces 927, and/or devices 928 may be attached, and/or communicate with the DOR controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Equivalent microcontrollers and/or processors may also be used. Other commercially available specialized cryptographic processors include: the Broadcom's CryptoNetX and other Security Processors; nCipher's nShield, SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+ MB/s of cryptographic instructions; VLSI Technology's 33 MHz 6868; and/or the like.

Memory

Generally, any mechanization and/or embodiment allowing a processor to affect the storage and/or retrieval of information is regarded as memory 929. However, memory is a fungible technology and resource, thus, any number of memory embodiments may be employed in lieu of or in concert with one another. It is to be understood that the DOR controller and/or a computer systemization may employ various forms of memory 929. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory 929 will include ROM 906, RAM 905, and a storage device 914. A storage device 914 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 929 may contain a collection of program and/or database components and/or data such as, but not limited to: operating system component(s) 915 (operating system); information server component(s) 916 (information server); user interface component(s) 917 (user interface); Web browser component(s) 918 (Web browser); database(s) 919; mail server component(s) 921; mail client component(s) 922; cryptographic server component(s) 920 (cryptographic server); the DOR component(s) 935; and/or the like (i.e., collectively a component collection). These components may be stored and accessed from the storage devices and/or from storage devices accessible through an interface bus. Although non-conventional program components such as those in the component collection, typically, are stored in a local storage device 914, they may also be loaded and/or stored in memory such as: peripheral devices, RAM, remote storage facilities through a communications network, ROM, various forms of memory, and/or the like.

Operating System

The operating system component 915 is an executable program component facilitating the operation of the DOR controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Nan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the DOR controller to communicate with other entities through a communications network 913. Various communication protocols may be used by the DOR controller as a subcarrier transport mechanism for interaction, such as, but not limited to: multicast, TCP/IP, UDP, unicast, and/or the like.

Information Server

An information server component 916 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the DOR controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port, and/or the like. An information server may communicate to and/or with other components in a component collection, including itself, and/or facilities of the like. Most frequently, the information server communicates with the DOR database 919, operating systems, other program components, user interfaces, Web browsers, and/or the like.

Access to the DOR database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the DOR. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the DOR as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 917 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 918 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the DOR enabled nodes. The combined application may be nugatory on systems employing standard Web browsers.

Mail Server

A mail server component 921 is a stored program component that is executed by a CPU 903. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POPS), simple mail transfer protocol (SMTP), and/or the like. The mail server can route, forward, and process incoming and outgoing mail messages that have been sent, relayed and/or otherwise traversing through and/or to the DOR.

Access to the DOR mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 922 is a stored program component that is executed by a CPU 903. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 920 is a stored program component that is executed by a CPU 903, cryptographic processor 926, cryptographic processor interface 927, cryptographic processor device 928, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the DOR may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the DOR component to engage in secure transactions if so desired. The cryptographic component facilitates the secure accessing of resources on the DOR and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The DOR Database

The DOR database component 919 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the DOR database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the DOR database is implemented as a data-structure, the use of the DOR database 919 may be integrated into another component such as the DOR component 935. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 919 includes several tables 919*a-i*. A Users table 919*a* may include fields such as, but not limited to: user_ID, ssn, first_name, last_name, middle_name, suffix, prefix, address_first_line, address_second_line, city, state, zipcode, country, birth_date, gender, device_ID_list, device_name_list, device_type_list, hardware_configuration_list, software_apps_list, device_IP_list, device_MAC_list, device_preferences_list, and/or the like. An Apps table 919*b* may include fields such as, but not limited to: app_ID, app_name, app_type, app_version, app_version_timestamp, app_prior_versions_list, app_prior_ versions_timestamps, app_update_schedule, app_scheduled_versions_list, app_scheduled_versions_dates, app_ scheduled_versions_priority, app_enviroment_type, app_envrionment_version, app_compatibilities_hw, app_compatibilities_sw, app_dependent_topology_tree, app_depend_module_list, app_depend_function_list, app_depend_apps_list, and/or the like. A Code table 919*c* may include fields such as, but not limited to: code_ID, code_name, code_type, code_version, code_version_timestamp, code_prior_versions_list, code_prior_versions_timestamps, code_update_schedule, code_scheduled_versions_list, code_ scheduled_versions_dates, code_scheduled_versions_priority, code_enviroment_type, code_environment_version, code_compatibilities_hw, code_compatibilities_sw, code_dependent_topology_tree, code_depend_module_list, code_depend_function_list, code_depend_codes_list, and/or the like. A Queues table 919d may include fields such as, but not limited to: render_request_ID, render_request_fields, render_request_string, render_request_origin, render_request_timestamp, render_request_priority, render_request_queue_ID, render_request_attempts, and/or the like. A Host Server table 919e may include fields such as, but not limited to: user_id, user_name, app_id, app_name, api_list, api_function_list, client_id, language_pref, and/or the like. A Computing Server table 919f may include fields such as, but not limited to: job_id, job_app_server_id, user_id, user_data, and/or the like. An App Server table 919g may include fields such as, but not limited to: app_id, app_name, app_versions, app_update_schedule, app_dependencies, app_specifications_list, and/or the like. A Client table 919h may include fields such as, but not limited to: user_id, user_name, client_ip_address, client_type, and/or the like. A Template table 919i may include fields such as, but not limited to: host_id, host_specifications_list, attachments_list, target_id, message, note, comment, submit_user_id, and/or the like. One or more of the tables discussed above may support and/or track multiple entity accounts on a DOR.

In one embodiment, the DOR database may interact with other database systems. For example, employing a distributed database system, queries and data access by search DOR component may treat the combination of the DOR database, an integrated data security layer database as a single database entity.

In one embodiment, user programs may contain various user interface primitives, which may serve to update the DOR. Also, various accounts may require custom database tables depending upon the environments and the types of clients the DOR may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 919a-s. The DOR may be configured to keep track of various settings, inputs, and parameters via database controllers.

The DOR database may communicate to and/or with other components in a component collection, including itself, and/or facilities of the like. Most frequently, the DOR database communicates with the DOR component, other program components, and/or the like. The database may contain, retain, and provide information regarding other nodes and data.

The DORs

The DOR component 935 is a stored program component that is executed by a CPU. In one embodiment, the DOR component incorporates any and/or all combinations of the aspects of the DOR discussed in the previous figures. As such, the DOR affects accessing, obtaining and the provision of information, services, transactions, and/or the like across various communications networks.

The DOR component enables live reconciliation of code updates to multi-user social networking applications in highly dynamic build environments, and/or the like and use of the DOR. In one embodiment, user inputs and selections of activities 402-414 are transformed via the client initialization component, the client transaction component, the render request processing component, and the request management component into target social postings.

The DOR component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the DOR server employs a cryptographic server to encrypt and decrypt communications. The DOR component may communicate to and/or with other components in a component collection, including itself, and/or facilities of the like. Most frequently, the DOR component communicates with the DOR database, operating systems, other program components, and/or the like. The DOR may contain, communicate, generate, obtain, and/or provide program component, system, user, and/or data communications, requests, and/or responses.

Distributed DORs

The structure and/or operation of any of the DOR node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques. For example, DOR server(s) and database(s) may all be localized within a single computing terminal. As another example, the DOR components may be localized within one or more entities (e.g., hospitals, pharmaceutical companies etc.) involved in coordinated patient management.

The configuration of the DOR controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), local and remote application program interfaces Jini, Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between components. For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or other wise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., the SOAP parser) that may be employed to parse communications data. Further, the parsing grammar may be used beyond message parsing, but may also be used to parse: databases, data collections, data stores, structured data, and/or the like. Again, the desired configuration will depend upon the context, environment, and requirements of system deployment.

Non-limiting exemplary embodiments highlighting numerous further advantageous aspects include:

1. A distributed rendering processor-implemented method embodiment, comprising:
obtaining a request to render an image of a visualization included in a client app;
analyzing the render request to determine data required for render processing;
providing a request for the data required for render processing; obtaining the data required for render processing upon providing the request for the required data;
recreating an app state of the client app using the obtained data required for render processing, the recreated app state including data related to the visualization included in the client app; and
rendering the image of the visualization including in the client app using the recreated app state.

2. The method of embodiment 1, further comprising:
generating a publishing element using the rendered image of the visualization included in the client app; and
providing the publishing element for publication.

3. The method of embodiment 1, wherein the client app is included in an Adobe Flash object.

4. The method of embodiment 1, wherein the client app includes a massively multiplayer gaming application.

5. The method of embodiment 1, wherein providing a request for the data required for render processing includes querying a database for the required data.

6. The method of embodiment 1, wherein the request for the data required for render processing is provided for a client executing the client app.

7. The method of embodiment 2, wherein the publishing element includes a message for posting on a Facebook webpage.

8. A distributed rendering system embodiment, comprising:
a processor; and
a memory disposed in communication with the processor and storing processor-executable instructions, the instructions comprising instructions to:
obtain a request to render an image of a visualization included in a client app;
analyze the render request to determine data required for render processing;
provide a request for the data required for render processing;
obtain the data required for render processing upon providing the request for the required data;
recreate an app state of the client app using the obtained data required for render processing, the recreated app state including data related to the visualization included in the client app; and
render the image of the visualization including in the client app using the recreated app state.

9. The system of embodiment 8, the instructions further comprising instructions to:
generate a publishing element using the rendered image of the visualization included in the client app; and
provide the publishing element for publication.

10. The system of embodiment 8, wherein the client app is included in an Adobe Flash object.

11. The system of embodiment 8, wherein the client app includes a massively multiplayer gaming application.

12. The system of embodiment 8, wherein providing a request for the data required for render processing includes querying a database for the required data.

13. The system of embodiment 8, wherein the request for the data required for render processing is provided for a client executing the client app.

14. The system of embodiment 9, wherein the publishing element includes a message for posting on a Facebook webpage.

15. A processor-readable medium embodiment storing processor-executable distributed rendering instructions, the instructions comprising instructions to:
obtain a request to render an image of a visualization included in a client app;
analyze the render request to determine data required for render processing;
provide a request for the data required for render processing;

obtain the data required for render processing upon providing the request for the required data;

recreate an app state of the client app using the obtained data required for render processing, the recreated app state including data related to the visualization included in the client app; and render the image of the visualization including in the client app using the recreated app state.

16. The medium of embodiment 15, the instructions further comprising instructions to:

generate a publishing element using the rendered image of the visualization included in the client app; and provide the publishing element for publication.

17. The medium of embodiment 15, wherein the client app is included in an Adobe Flash object.

18. The medium of embodiment 15, wherein the client app includes a massively multiplayer gaming application.

19. The medium of embodiment 15, wherein providing a request for the data required for render processing includes querying a database for the required data.

20. The medium of embodiment 15, wherein the request for the data required for render processing is provided for a client executing the client app.

21. The system of embodiment 16, wherein the publishing element includes a message for posting on a Facebook webpage.

22. A rendering request processor-implemented method embodiment, comprising:

obtaining a client app from an app database;

obtaining user input from a user for the client app;

generating data pertaining to a visualization included in the client app based on the obtained user input;

providing a request for rendering an image of the visualization included in the client app; and providing the data pertaining to the visualization for processing the request for rendering the image of the visualization included in the client app.

23. The method of embodiment 22, further comprising:

providing an indication to publish the image of the visualization included in the client app.

24. The method of embodiment 22, further comprising:

obtaining data associated with the client app and pertaining to a member of a social graph of the user; and wherein generating data pertaining to the visualization included in the client app is further based on the obtained data pertaining to the member of the social graph of the user.

25. The method of embodiment 22, wherein the client app includes a massively multiplayer gaming application.

26. The method of embodiment 22, wherein the client app is included in an Adobe Flash object.

27. The method of embodiment 22, wherein providing the data pertaining to the visualization for processing the request for rendering the image includes:

freezing a state of the client app; and obtaining a snapshot of the frozen state of the client app.

28. The method of embodiment 23, wherein the indication includes an indication to publish the image of the visualization included in the client app to a Facebook webpage.

29. A rendering request apparatus embodiment, comprising:

a processor; and a memory disposed in communication with the processor and storing processor-executable instructions, the instructions comprising instructions to:

obtain a client app from an app database;

obtain user input from a user for the client app;

generate data pertaining to a visualization included in the client app based on the obtained user input;

provide a request for rendering an image of the visualization included in the client app; and provide the data pertaining to the visualization for processing the request for rendering the image of the visualization included in the client app.

30. The apparatus of embodiment 29, the instructions further comprising instructions to:

provide an indication to publish the image of the visualization included in the client app.

31. The apparatus of embodiment 29, the instructions further comprising instructions to:

obtain data associated with the client app and pertaining to a member of a social graph of the user; and wherein generating data pertaining to the visualization included in the client app is further based on the obtained data pertaining to the member of the social graph of the user.

32. The apparatus of embodiment 29, wherein the client app includes a massively multiplayer gaming application.

33. The apparatus of embodiment 29, wherein the client app is included in an Adobe Flash object.

34. The apparatus of embodiment 29, wherein the instructions to provide the data pertaining to the visualization for processing the request for rendering the image include instructions to:

freeze a state of the client app; and obtain a snapshot of the frozen state of the client app.

35. The apparatus of embodiment 30, wherein the indication includes an indication to publish the image of the visualization included in the client app to a Facebook webpage.

36. A processor-readable medium embodiment storing processor-executable rendering request instructions, the instructions comprising instructions to:

obtain a client app from an app database;

obtain user input from a user for the client app;

generate data pertaining to a visualization included in the client app based on the obtained user input;

provide a request for rendering an image of the visualization included in the client app; and provide the data pertaining to the visualization for processing the request for rendering the image of the visualization included in the client app.

37. The medium of embodiment 36, the instructions further comprising instructions to:

provide an indication to publish the image of the visualization included in the client app.

38. The medium of embodiment 36, the instructions further comprising instructions to:

obtain data associated with the client app and pertaining to a member of a social graph of the user; and wherein generating data pertaining to the visualization included in the client app is further based on the obtained data pertaining to the member of the social graph of the user.

39. The medium of embodiment 36, wherein the client app includes a massively multiplayer gaming application.

40. The medium of embodiment 36, wherein the client app is included in an Adobe Flash object.

41. The medium of embodiment 36, wherein the instructions to provide the data pertaining to the visualization for processing the request for rendering the image include instructions to:

freeze a state of the client app; and obtain a snapshot of the frozen state of the client app.

42. The medium of embodiment 37, wherein the indication includes an indication to publish the image of the visualization included in the client app to a Facebook webpage.

In order to address various issues and improve over the prior art, the invention is directed to apparatuses, methods and systems for a mobile healthcare management system. The entirety of this application (including the Cover Page, Title, Headings, Field, Background, Summary, Brief Description of the Drawings, Detailed Description, Claims, Abstract, Figures, Appendices and/or otherwise) shows by way of illustration various embodiments in which the claimed inventions may be practiced. The advantages and features of the application are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims. It is to be understood that, depending on the particular needs of the DOR and/or characteristics of the hardware, software, network framework, monetization model and/or the like, various embodiments of the DOR may be implemented that enable a great deal of flexibility and customization. It is to be understood that, depending on the particular needs of the DOR and/or characteristics of the hardware, software, network framework, monetization model and/or the like, various embodiments of the DOR may be implemented that enable a great deal of flexibility and customization. The instant disclosure discusses example implementations of the DOR within the context of multi-user gaming applications. However, it is to be understood that the system described herein can be readily configured for a wide range of other applications and/or implementations. For example, implementations of the DOR can be configured to operate within the context of bogging, micro-blogging, professional networking, and/or the like. Alternate implementations of the system may be utilized in various contexts outside social networking, including, but not limited to, office productivity/collaboration software, distributed online advertising, networked surveillance systems, sensor networks, and/or the like. It is to be understood that the DOR may be further adapted to other implementations and/or software management.

What is claimed:

1. A method, comprising operations of:
   generating a render request record for a render request submitted by a user of an app and storing the render request record in a queue database, wherein the render request includes a visualization to be rendered;
   selecting the render request record from the queue database, wherein selection of the render request record is determined at least in part by a priority value that depends on an amount of time the user has spent using the app;
   generating a rendered image for the selected render request record, using render data; and
   publishing a publishing element including the rendered image to a newsfeed stream displayed by a social networking site, wherein each of the operations are executed by one or more processors.

2. The method of claim 1, further comprising operations of:
   determining the render process requirements for the selected render request record; and
   querying a user profile database for render data based on the render process requirements.

3. The method of claim 1, further comprising operations of:
   transmitting a request to provide render data to a client device, if render data is not available in the user profile database; and
   receiving a response from the client device, including the requested render data.

4. The method of claim 1, further comprising the operation of:
   creating a publishing element from the rendered image and a publishing template.

5. The method of claim 1, wherein the publishing operation uses an application programming interface (API) provided by the social networking site.

6. The method of claim 1, wherein the request to provide render data includes a request to provide a snapshot of a frozen user interface (UI) state.

7. The method of claim 1, wherein the render request is for an app that is a massively multiplayer gaming application.

8. One or more computer-readable media that are non-transitory and that store instructions, which when executed by a processor, perform the following operations:
   generate a render request record for a render request submitted by a user of an app and store the render request record in a queue database, wherein the render request includes a visualization to be rendered;
   select the render request record from the queue database, wherein selection of the render request record is determined at least in part by a priority value that depends on an amount of time the user has spent using the app;

generate a rendered image for the selected render request record, using render data; and publish a publishing element including the rendered image to a newsfeed stream displayed by a social networking site.

9. The computer-readable media of claim 8, further comprising operations of:

determine the render process requirements for the selected render request record; and query a user profile database for render data based on the render process requirements.

10. The computer-readable media of claim 8, further comprising operations of:

transmit a request to provide render data to a client device, if render data is not available in the user profile database; and receive a response from the client device, including the requested render data.

11. The computer-readable media of claim 8, further comprising the operation of:

create a publishing element from the rendered image and a publishing template.

12. The computer-readable media of claim 8, wherein the publishing operation uses an application programming interface (API) provided by the social networking site.

13. The computer-readable media of claim 8, wherein the request to provide render data includes a request to provide a snapshot of a frozen user interface (UI) state.

14. The computer-readable media of claim 8, wherein the render request is for an app that is a massively multiplayer gaming application.

15. A method, comprising operations of:

generating a render request record for a render request submitted by a user of an app and storing the render request record in a queue database, wherein the render request includes a visualization to be rendered;

selecting the render request record from the queue database, wherein selection of the render request record is determined at least in part by a priority value that depends on a frequency with which the visualization has occurred within the app when used by the user;

generating a rendered image for the selected render request record, using render data; and publishing a publishing element including the rendered image to a newsfeed stream displayed by a social networking site, wherein each of the operations are executed by one or more processors.

16. The method of claim 15, further comprising operations of:

determining the render process requirements for the selected render request record; and querying a user profile database for render data based on the render process requirements.

17. The method of claim 15, further comprising operations of:

transmitting a request to provide render data to a client device, if render data is not available in the user profile database; and receiving a response from the client device, including the requested render data.

18. The method of claim 15, further comprising the operation of:

creating a publishing element from the rendered image and a publishing template.

19. The method of claim 15, wherein the publishing operation uses an application programming interface (API) provided by the social networking site.

20. The method of claim 15, wherein the request to provide render data includes a request to provide a snapshot of a frozen user interface (UI) state.

* * * * *